(12) United States Patent
Sugita

(10) Patent No.: US 9,217,849 B2
(45) Date of Patent: Dec. 22, 2015

(54) ZOOM LENS AND IMAGE PICKUP APPARATUS

(71) Applicant: CANON KABUSHIKI KAISHA, Tokyo (JP)

(72) Inventor: Shigenobu Sugita, Shimotsuke (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 171 days.

(21) Appl. No.: 13/933,178

(22) Filed: Jul. 2, 2013

(65) Prior Publication Data

US 2014/0009832 A1    Jan. 9, 2014

(30) Foreign Application Priority Data

Jul. 3, 2012   (JP) ................. 2012-149260

(51) Int. Cl.
  G02B 15/14      (2006.01)
  G02B 27/64      (2006.01)
  G02B 15/173     (2006.01)

(52) U.S. Cl.
  CPC .............. *G02B 15/14* (2013.01); *G02B 15/173* (2013.01); *G02B 27/646* (2013.01)

(58) Field of Classification Search
  CPC ..... G02B 27/646; G02B 15/14; G02B 15/173
  See application file for complete search history.

(56) References Cited

U.S. PATENT DOCUMENTS

| 7,126,758 | B2 * | 10/2006 | Fujimoto et al. ............. 359/676 |
| 7,839,577 | B2 * | 11/2010 | Yamamoto et al. ........... 359/676 |
| 2005/0237626 | A1 | 10/2005 | Park |
| 2013/0088622 | A1 * | 4/2013 | Sugita ........................... 348/294 |
| 2014/0009652 | A1 * | 1/2014 | Sugita ........................... 348/294 |
| 2014/0118839 | A1 * | 5/2014 | Sugita ........................... 359/683 |

FOREIGN PATENT DOCUMENTS

| CN | 102043236 A | 5/2011 |
| CN | 102109665 A | 6/2011 |
| CN | 102466873 A | 5/2012 |
| JP | 2008-216481 A | 9/2008 |
| JP | 2010-019945 A | 1/2010 |
| JP | 2010-271362 A | 12/2010 |

OTHER PUBLICATIONS

Chinese Office Action issued in corresponding application No. 201310265366.7 on Feb. 27, 2015.

* cited by examiner

*Primary Examiner* — David N Spector
(74) *Attorney, Agent, or Firm* — Carter, DeLuca, Farrell & Schmidt, LLP

(57) ABSTRACT

The zoom lens includes in order from an object side to an image side where N represents an integer equal to or more than 5, a first lens unit, a second lens unit, an (N−2)-th lens unit, an (N−1)-th lens unit and an N-th lens unit respectively having positive, negative, positive, negative and positive refractive powers. The (N−1)-th lens unit includes an image stabilizing lens unit. The conditions of $0.01 < BldN/TDw < 0.09$ and $2.0 < f_N/fw < 8.0$ are satisfied where BldN represents a length of the N-th lens unit on the optical axis, TDw represents a distance on the optical axis between a most object side lens surface and a most-image side lens surface at a wide-angle end, fw represents a focal length of the entire zoom lens at the wide-angle end, and $f_N$ represents a focal length of the N-th lens unit.

10 Claims, 17 Drawing Sheets

ZOOM LENS AND IMAGE PICKUP APPARATUS

BACKGROUND OF THE INVENTION

1. Field of the Invention

The present invention relates to a zoom lens suitable for image pickup apparatuses, such as cameras, using a solid image sensor or a silver-halide film.

2. Description of the Related Art

Image taking optical systems used for image pickup apparatuses are requested to be entirely compact, be capable of image taking with a wide angle of view, have a high zoom ratio and be provided with an image stabilizing mechanism to correct (reduce) image blur generated due to camera shake caused by hand jiggling or the like.

Moreover, the image taking optical systems as zoom lenses are also requested to have a configuration in which a movement of an image stabilizing lens unit, which constitutes part of the zoom lens, in a direction orthogonal to an optical axis for correction of the image blur causes less variation of aberrations.

An inappropriate configuration of the zoom lens or a lens unit placed further on an image side than the image stabilizing lens unit increases decentering aberration when the image blur correction is performed, which deteriorates optical performance of the zoom lens.

Therefore, in order to achieve an entirely compact configuration, a wide angle of view, a high zoom ratio and high optical performance during the image blur correction, it is important to appropriately set the configuration of the entire zoom lens, the configuration of the lens unit placed further on the image side than the image stabilizing lens unit and others.

As positive-lead type zoom lenses in which a most-object side lens unit has a positive refractive power, a zoom lens is known in which a lens unit constituting part of the zoom lens is moved for the image blur correction in a direction including a directional component orthogonal to an optical axis of the zoom lens.

Japanese Patent Laid-Open No. 2010-019945 discloses a zoom lens including, in order from an object side to an image side, a first lens unit having a positive refractive power, a second lens unit having a negative refractive power, a third lens unit having a positive refractive power and a fourth lens unit having a positive refractive power. In this zoom lens, the third lens unit is divided into a lens unit having a positive refractive power and a lens unit having a negative refractive power, and image blur correction is performed by moving the negative lens unit in a direction orthogonal to an optical axis of the zoom lens.

Japanese Patent Laid-Open No. 2010-271362 discloses a zoom lens including, in order from an object side to an image side, a first lens unit having a positive refractive power, a second lens unit having a negative refractive power, a third lens unit having a positive refractive power, a fourth lens unit having a negative refractive power and a fifth lens unit having a positive refractive power. In this zoom lens, image blur correction is performed by moving the fourth lens unit or part thereof in a direction orthogonal to an optical axis of the zoom lens.

The configurations of the zoom lenses disclosed in Japanese Patent Laid-Open Nos. 2010-019945 and 2010-271362 are advantageous to achieve a high zoom ratio, but make it difficult to achieve an entirely compact configuration and a wide angle of view.

SUMMARY OF THE INVENTION

The present invention provides a zoom lens capable of providing high optical performance even when the image blur correction is performed while having an entirely compact configuration, a wide angle of view and a high zoom ratio, and further provides an image pickup apparatus including the zoom lens.

The present invention provides as one aspect thereof a zoom lens including, in order from an object side to an image side where N represents an integer equal to or more than 5, a first lens unit having a positive refractive power, a second lens unit having a negative refractive power, an (N−2)-th lens unit having a positive refractive power, an (N−1)-th lens unit having a negative refractive power, and an N-th lens unit having a positive refractive power. Distances between adjacent ones of the first, second, (N−2)-th, (N−1)-th and N-th lens units in a direction of an optical axis are changed during zooming. The (N−1)-th lens unit includes an image stabilizing lens unit movable for image blur correction in a direction including a directional component orthogonal to the optical axis. The following conditions are satisfied:

$$0.01 < BldN/TDw < 0.09$$

$$2.0 < f_N/fw < 8.0$$

where BldN represents a length of the N-th lens unit on the optical axis, TDw represents a distance on the optical axis between a most-object side lens surface and a most-image side lens surface at a wide-angle end, fw represents a focal length of the entire zoom lens at the wide-angle end, and $f_N$ represents a focal length of the N-th lens unit.

The present invention provides as another aspect thereof an image pickup apparatus including the above zoom lens, and an image sensor to receive an optical image formed by the zoom lens.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

A zoom lens of each of embodiments, which will be described later, of the present invention includes in order from an object side to an image side where N represents an integer equal to or more than 5, a first lens unit having a positive refractive power, a second lens unit having a negative refractive power, an (N−2)-th lens unit having a positive refractive power, an (N−1)-th lens unit having a negative refractive power, and an N-th lens unit having a positive refractive power. In this zoom lens, distances between adjacent ones of the first, second, (N−2)-th, (N−1)-th and N-th lens units in a direction of an optical axis (hereinafter referred to as "an optical axis direction" are changed during zooming. The (N−1)-th lens unit includes an image stabilizing lens unit movable for image blur correction (image stabilization) in a direction including a directional component orthogonal to the optical axis.

Figure 1:
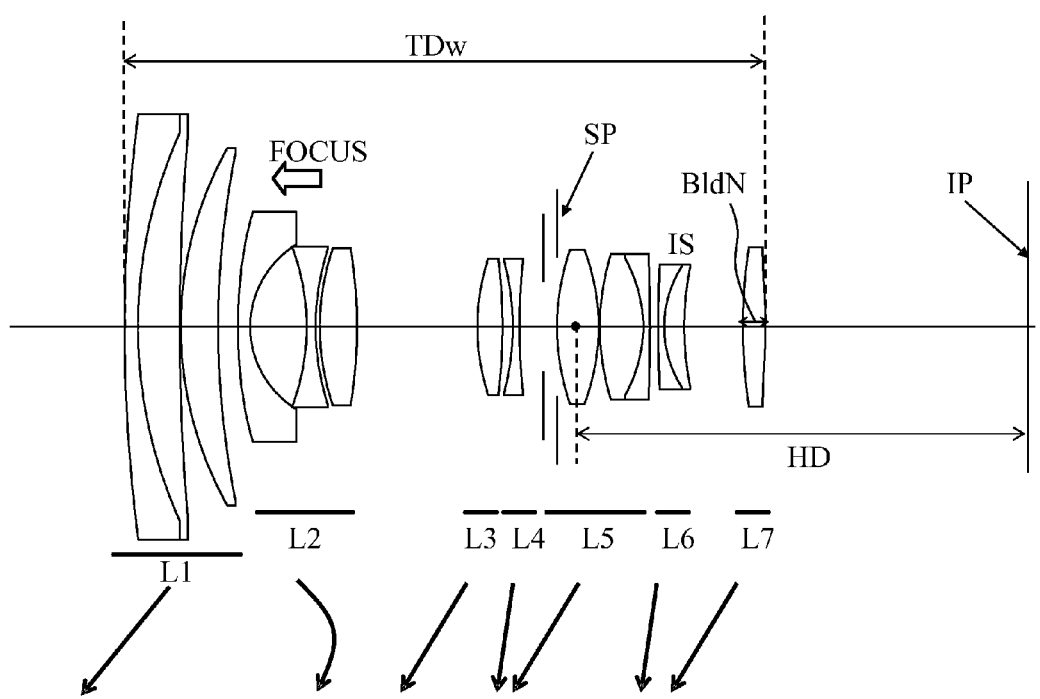
FIG. 1 is a sectional view of a zoom lens that is Embodiment 1 of the present invention at a wide angle end.
Figure 2A:
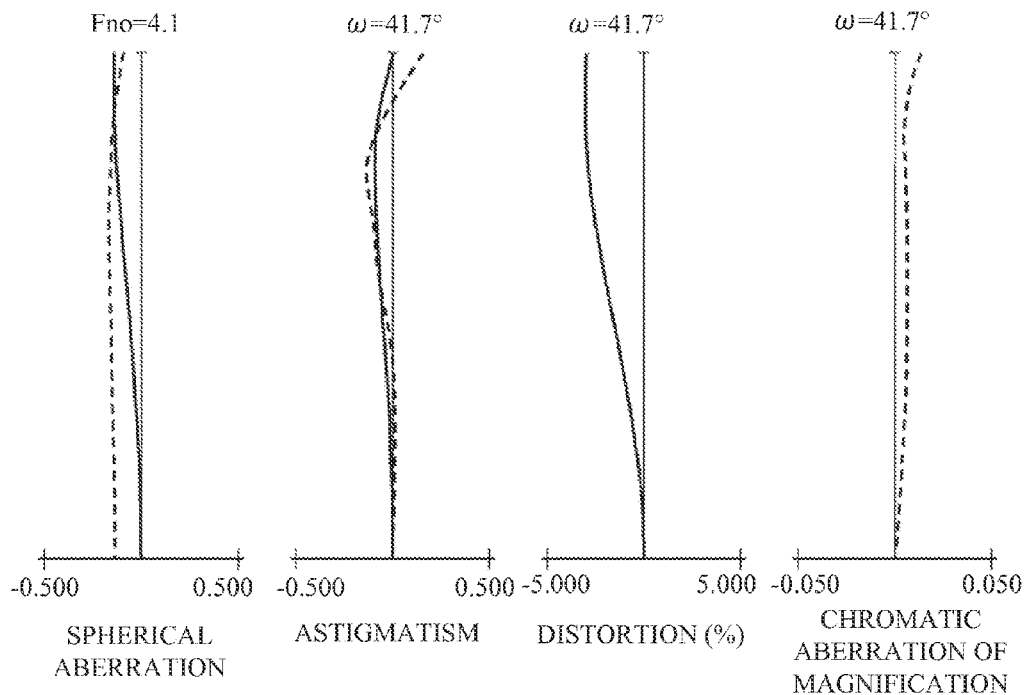
FIGS. 2A and 2B are longitudinal aberration charts of Numerical Example 1 of the present invention at a wide-angle end and a telephoto end.
Figure 2B:
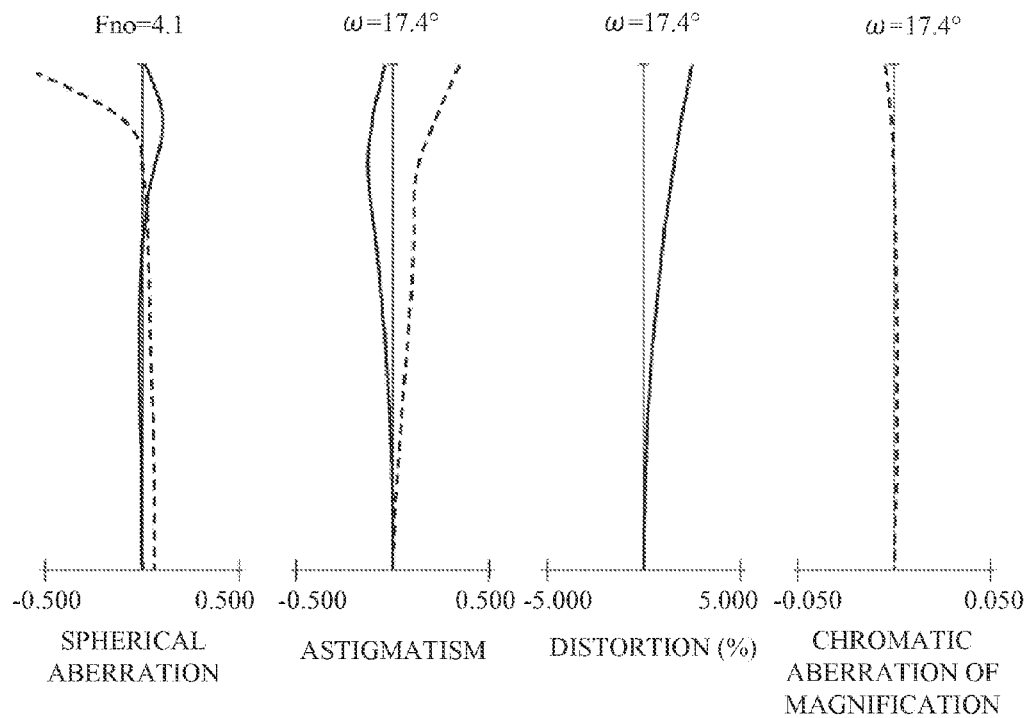
Figure 3A:
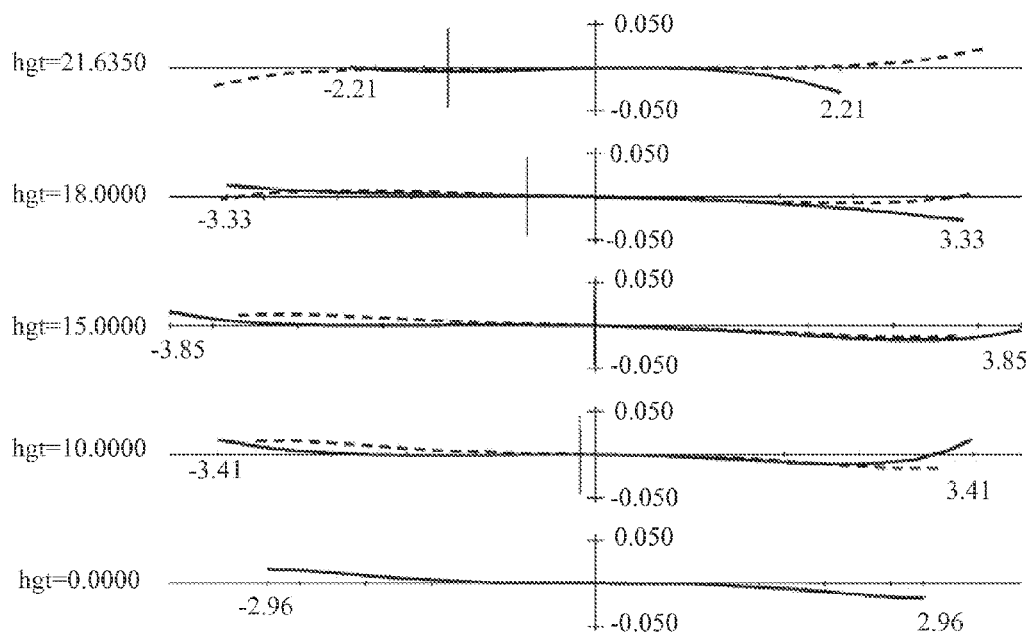
FIGS. 3A and 3B are lateral aberration charts of Numerical Example 1 of the present invention at a wide-angle end and a telephoto end.
Figure 3B:
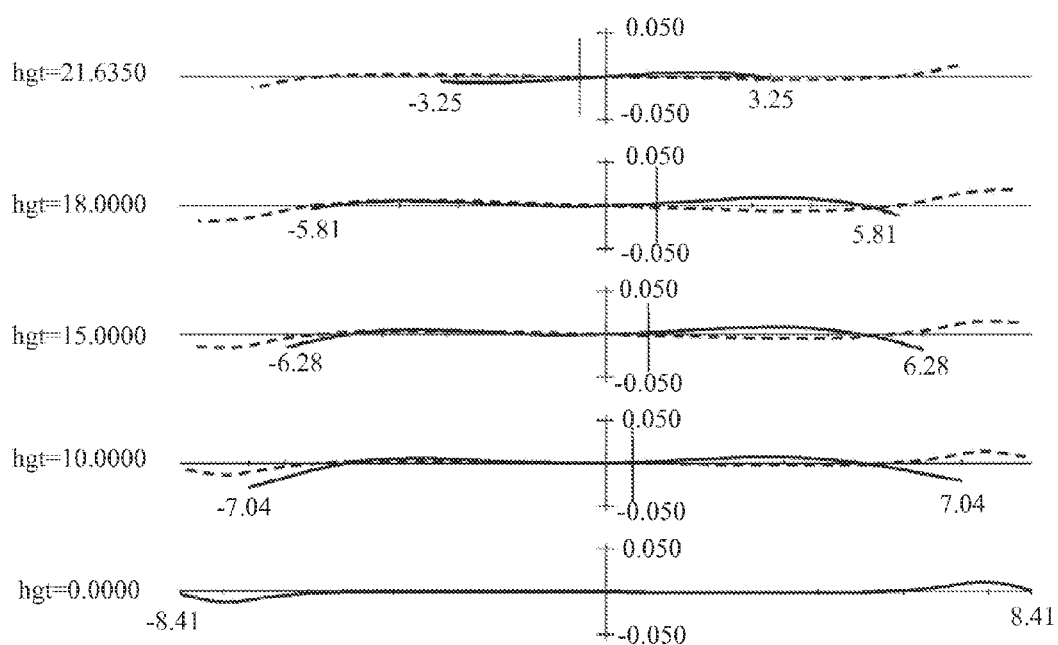
Figure 4A:
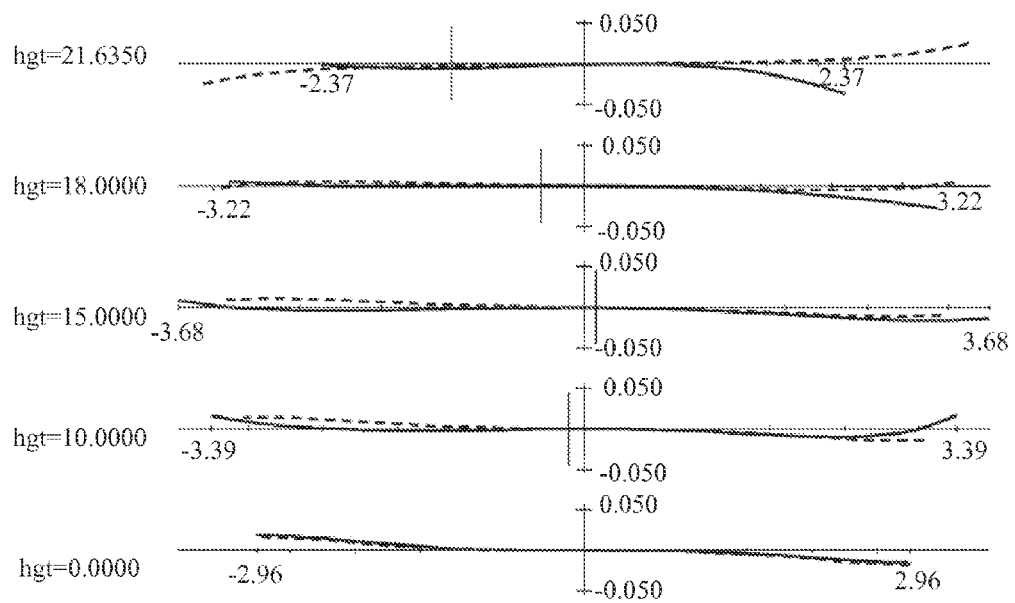
FIGS. 4A and 4B are lateral aberration charts of Numerical Example 1 at the wide-angle end and the telephoto end in a state of performing a 0.5-degree image stabilizing shift.
Figure 4B:
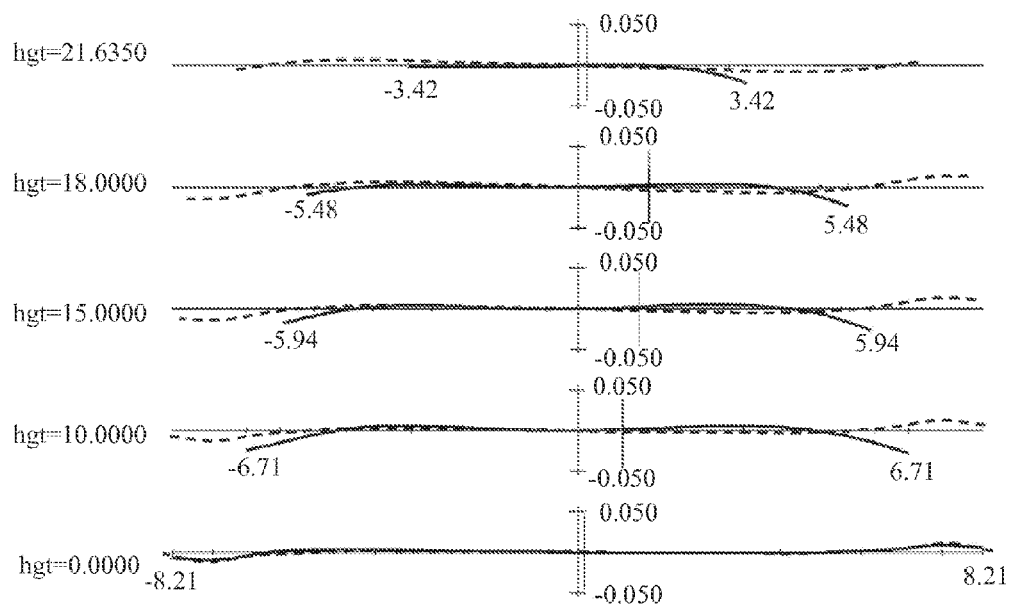

FIG. 1 is a sectional view showing a configuration of the zoom lens that is a first embodiment (Embodiment 1) at a wide-angle end where a shortest focal length is provided. FIGS. 2A and 2B are longitudinal aberration charts of a first numerical example (Numerical Example 1) corresponding to Embodiment 1 at the wide-angle end and a telephoto end providing a longest focal length. FIGS. 3A and 3B are lateral aberration charts of Numerical Example 1 at the wide-angle end and the telephoto end. FIGS. 4A and 4B are lateral aberration charts of Numerical Example 1 at the wide-angle end and the telephoto end in a state of performing a 0.5-degree image stabilizing shift (described later) to change an imaging position. The zoom lens of Numerical Example 1 (Embodiment 1) has a zoom ratio of 2.84 and an F-number of 4.10.

Figure 5:
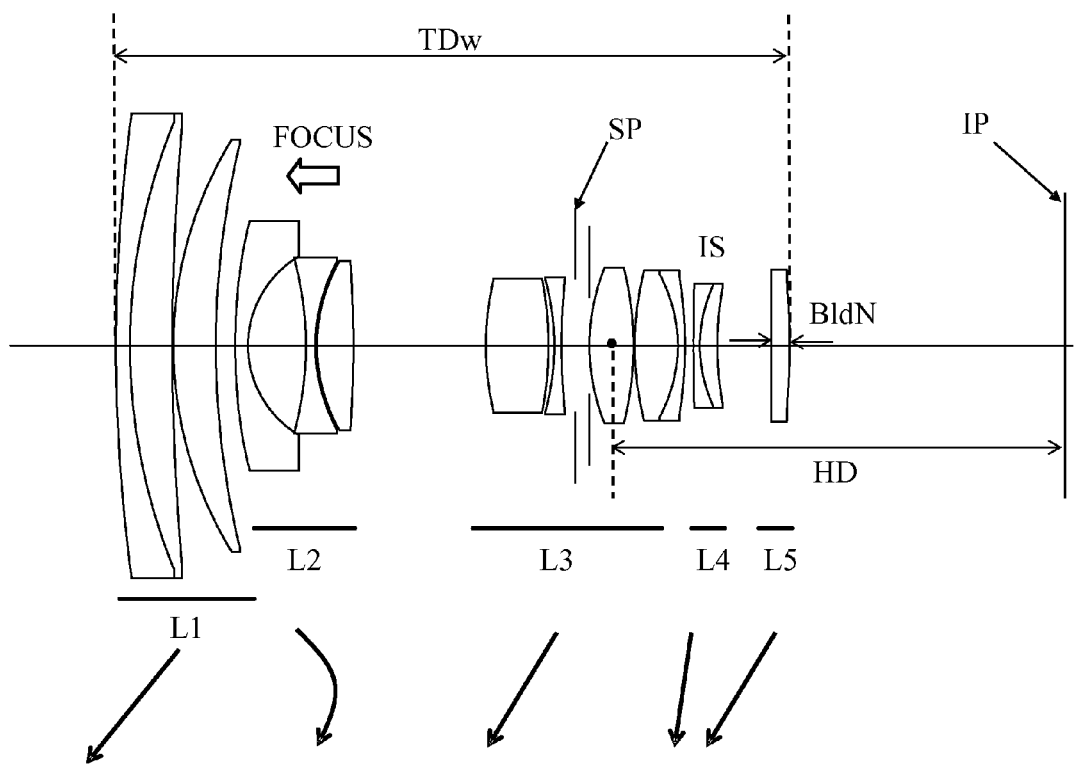
FIG. 5 is a sectional view of a zoom lens that is Embodiment 2 of the present invention at a wide angle end.
Figure 6A:
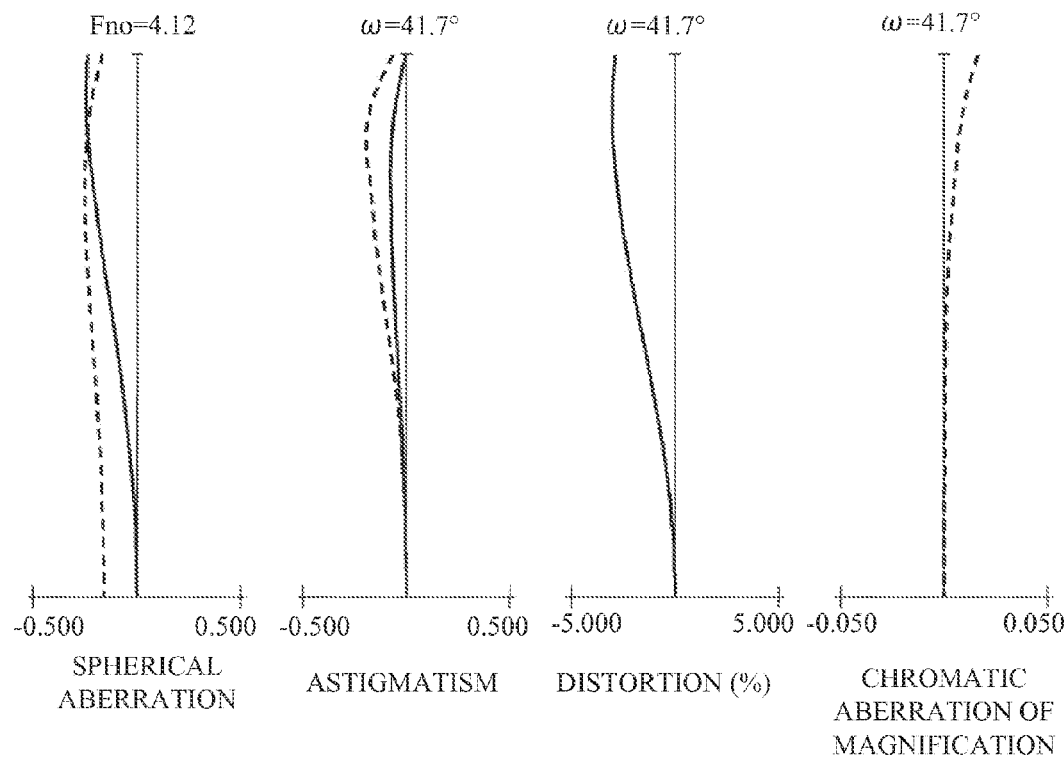
FIGS. 6A and 6B are longitudinal aberration charts of Numerical Example 2 of the present invention at a wide-angle end and a telephoto end.
Figure 6B:
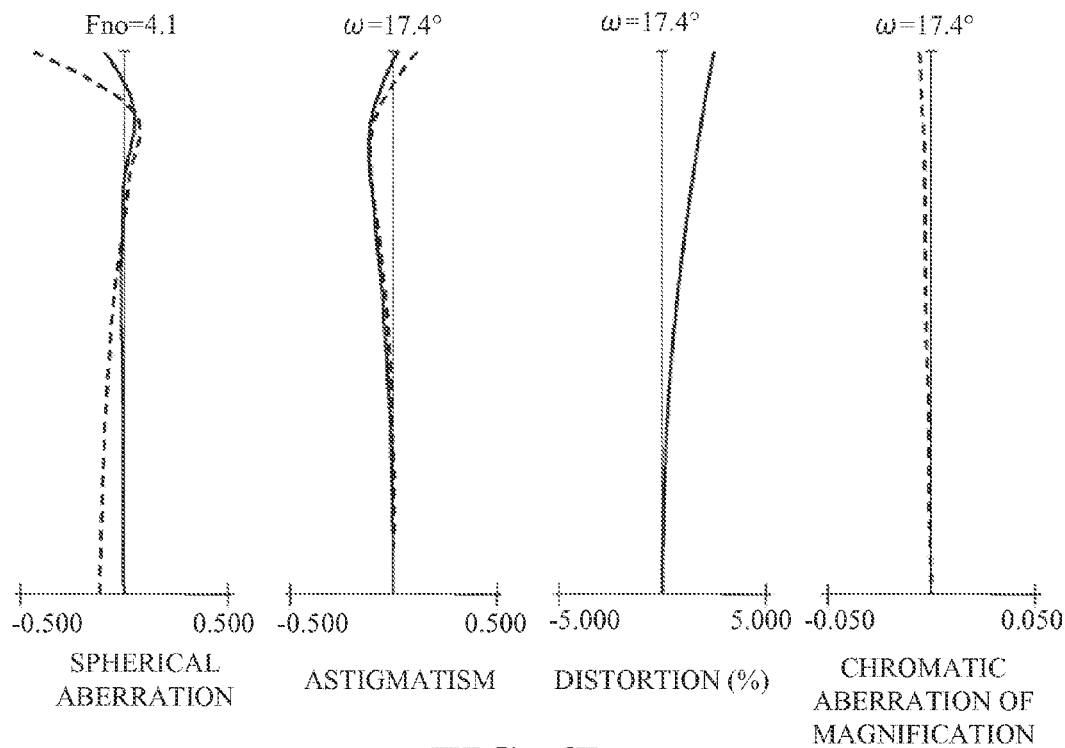
Figure 7A:
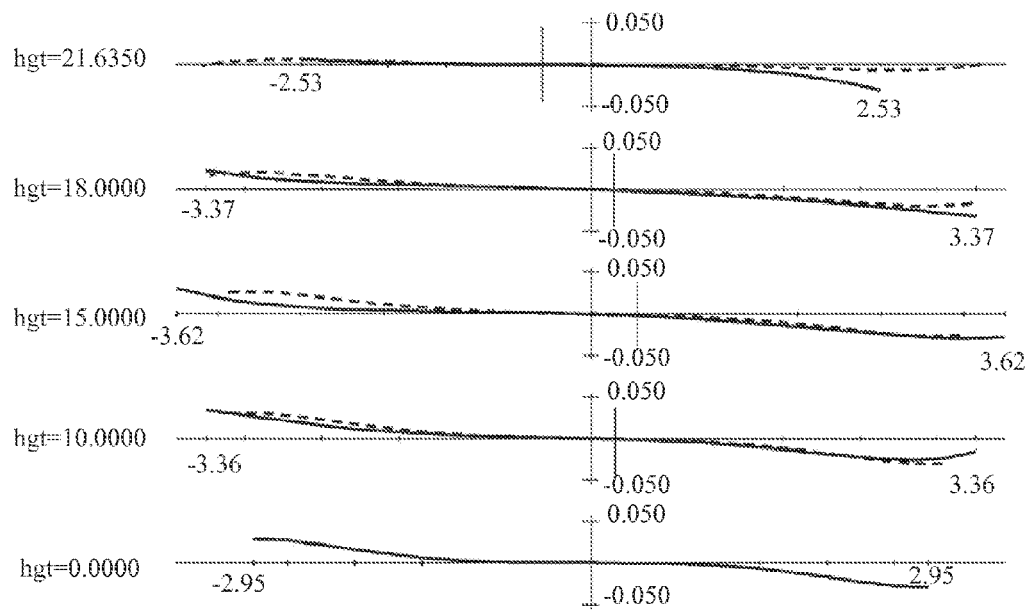
FIGS. 7A and 7B are lateral aberration charts of Numerical Example 2 of the present invention at the wide-angle end and the telephoto end.
Figure 7B:
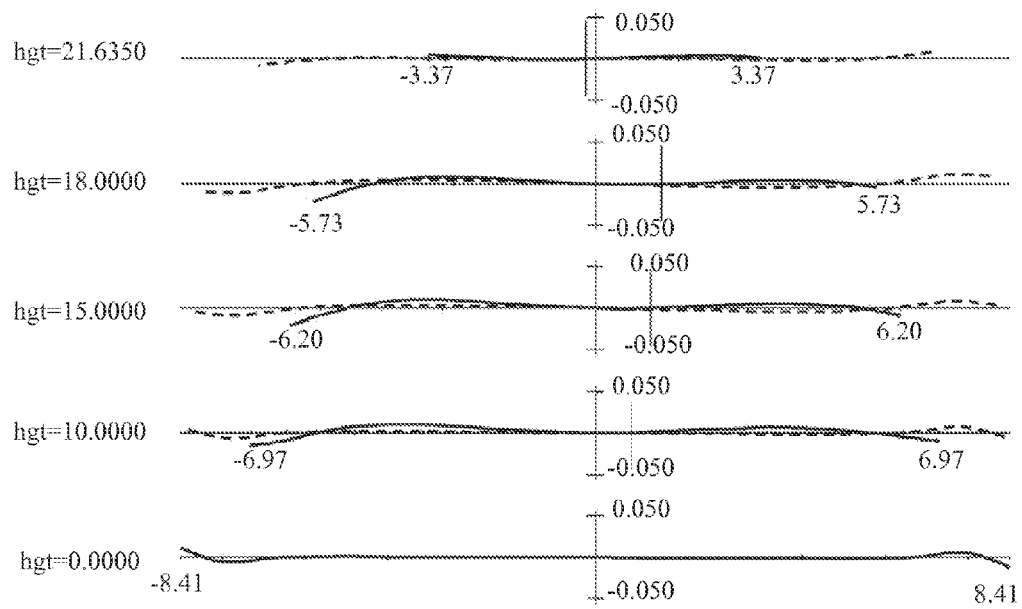
Figure 8A:
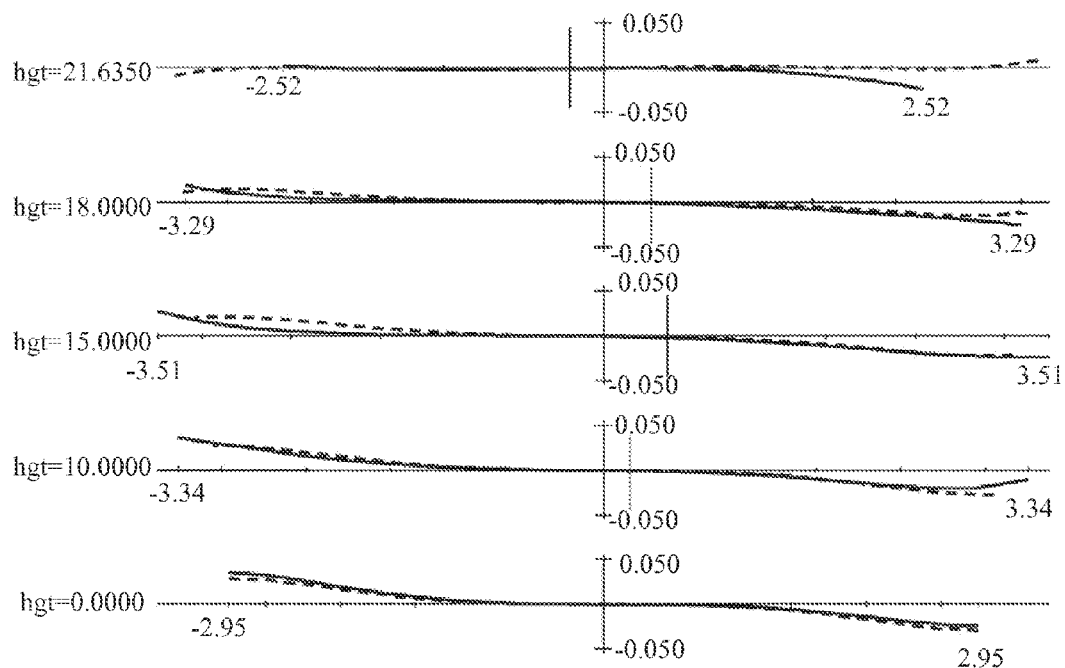
FIGS. 8A and 8B are lateral aberration charts of Numerical Example 2 at the wide-angle end and the telephoto end in a state of performing a 0.5-degree image stabilizing shift.
Figure 8B:
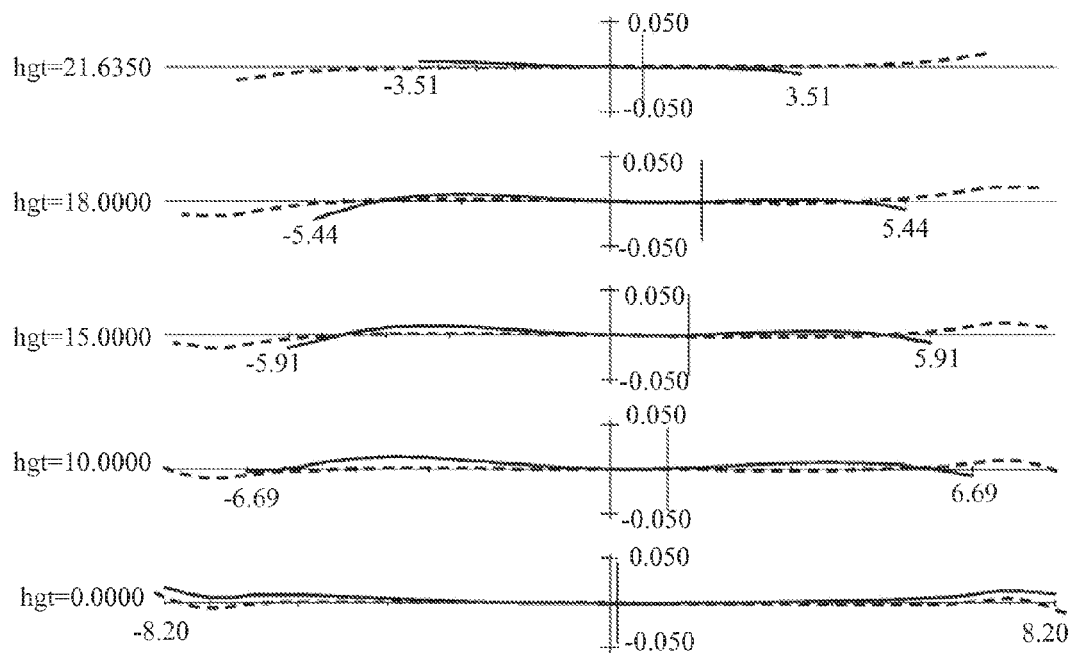

FIG. 5 is a sectional view showing a configuration of the zoom lens that is a second embodiment (Embodiment 2) at a wide-angle end. FIGS. 6A and 6B are longitudinal aberration charts of a second numerical example (Numerical Example 2) corresponding to Embodiment 2 at the wide-angle end and a telephoto end. FIGS. 7A and 7B are lateral aberration charts of Numerical Example 2 at the wide-angle end and the telephoto end. FIGS. 8A and 8B are lateral aberration charts of Numerical Example 2 at the wide-angle end and the telephoto end in a state of performing a 0.5-degree image stabilizing shift. The zoom lens of Numerical Example 2 (Embodiment 2) has a zoom ratio of 2.84 and an F-number from 4.12 to 4.10.

Figure 9:
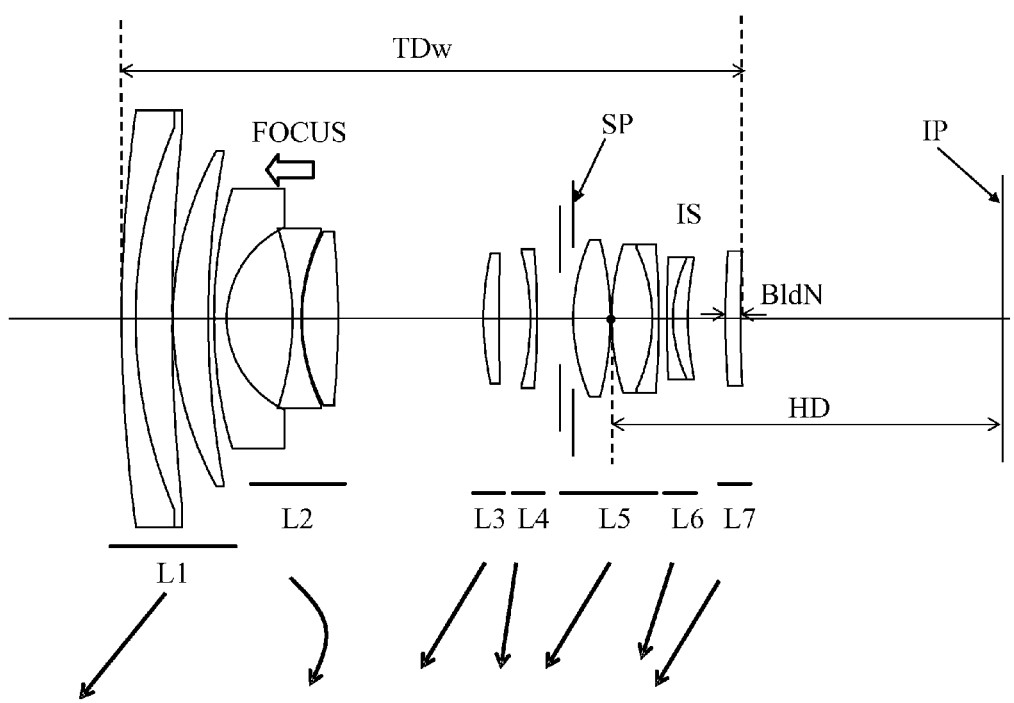
FIG. 9 is a sectional view of a zoom lens that is Embodiment 3 of the present invention at a wide angle end.
Figure 10A:
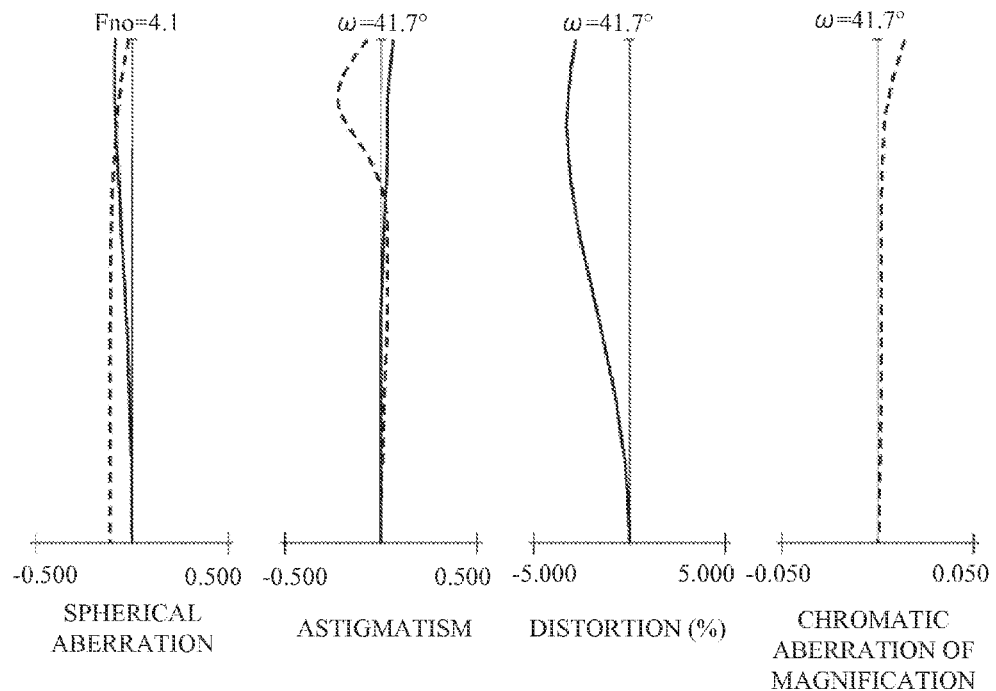
FIGS. 10A and 10B are longitudinal aberration charts of Numerical Example 3 of the present invention at a wide-angle end and a telephoto end.
Figure 10B:
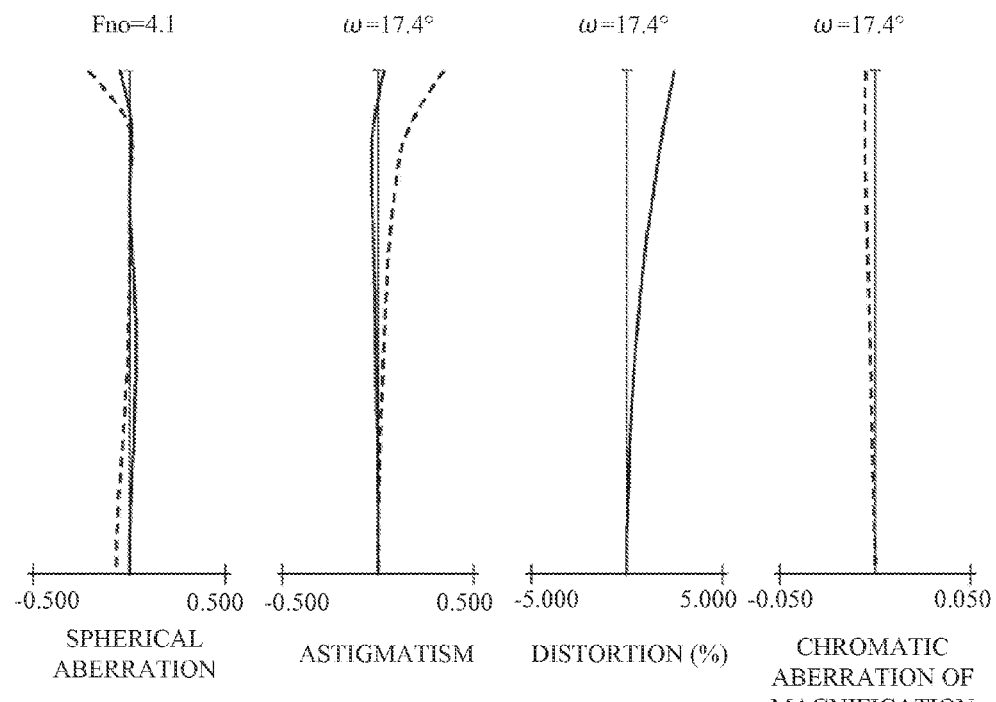
Figure 11A:
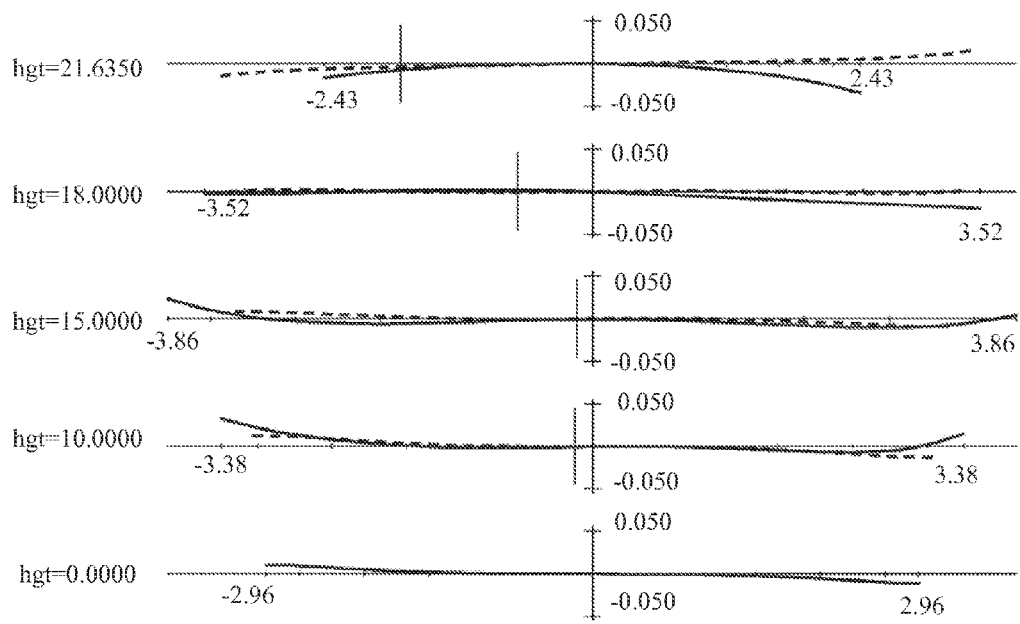
FIGS. 11A and 11B are lateral aberration charts of Numerical Example 3 of the present invention at the wide-angle end and the telephoto end.
Figure 11B:
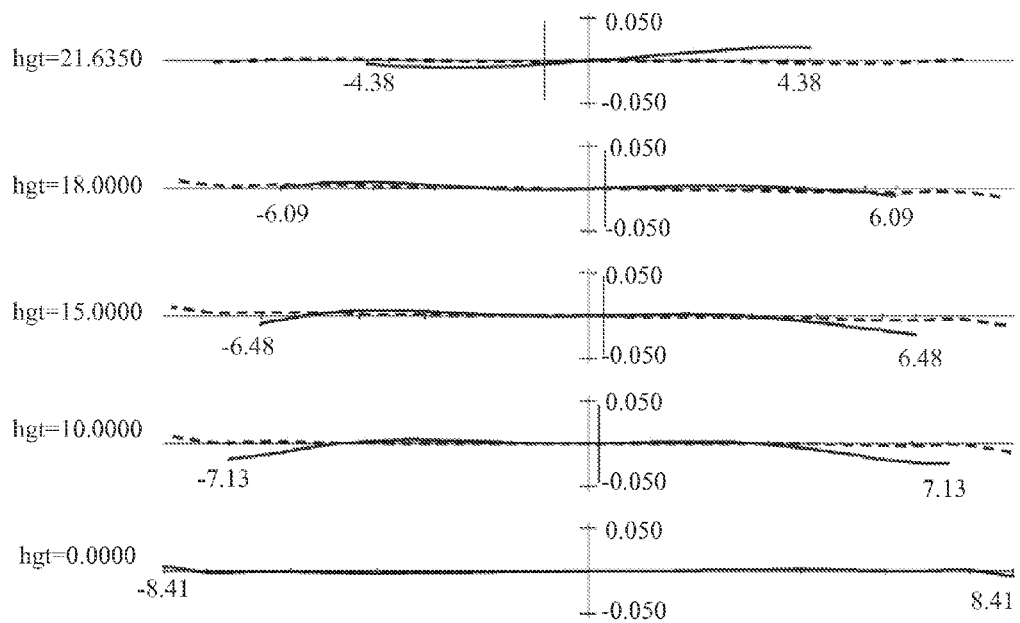
Figure 12A:
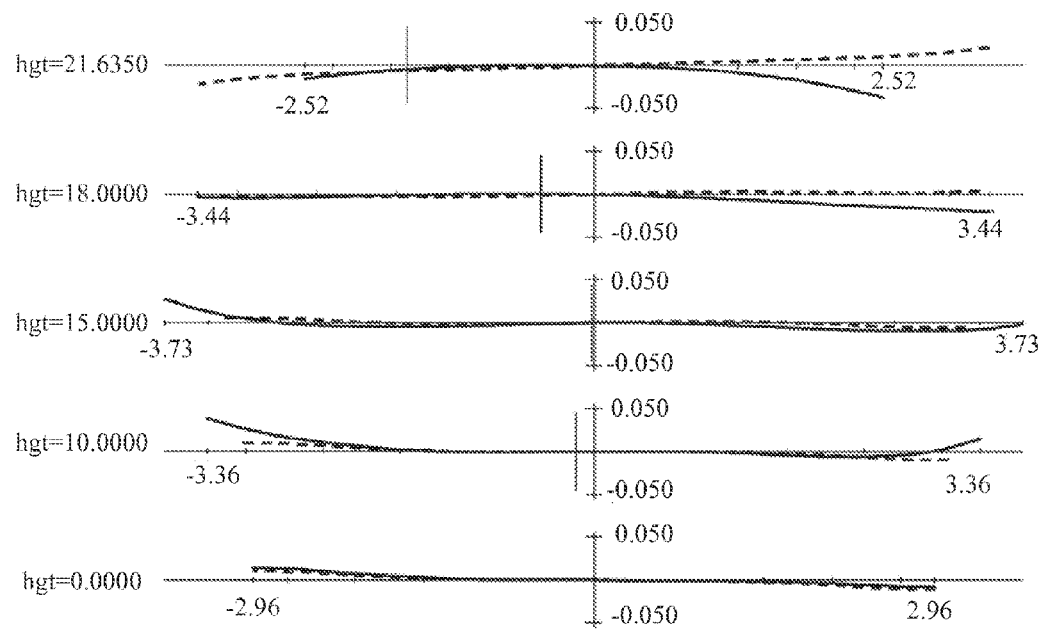
FIGS. 12A and 12B are lateral aberration charts of Numerical Example 3 at the wide-angle end and the telephoto end in a state of performing a 0.5-degree image stabilizing shift.
Figure 12B:
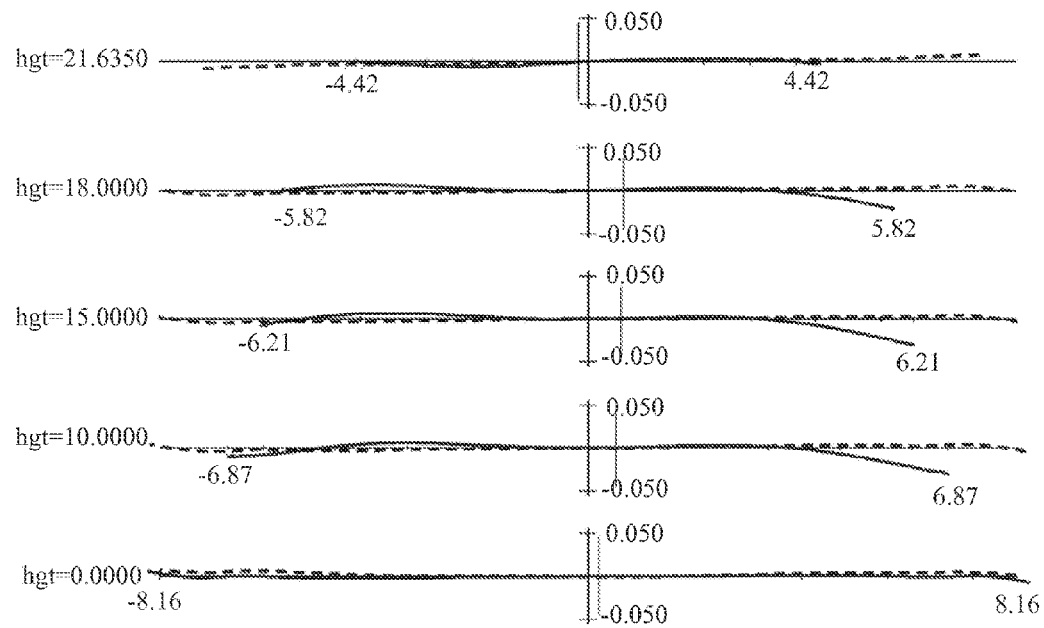

FIG. 9 is a sectional view showing a configuration of the zoom lens that is a third embodiment (Embodiment 3) at a wide-angle end. FIGS. 10A and 10B are longitudinal aberration charts of a third numerical example (Numerical Example 3) corresponding to Embodiment 3 at the wide-angle end and a telephoto end. FIGS. 11A and 11B are lateral aberration charts of Numerical Example 3 at the wide-angle end and the telephoto end. FIGS. 12A and 12B are lateral aberration charts of Numerical Example 3 at the wide-angle end and the telephoto end in a state of performing a 0.5-degree image stabilizing shift. The zoom lens of Numerical Example 3 (Embodiment 3) has a zoom ratio of 2.84 and an F-number of 4.10.

Figure 13:
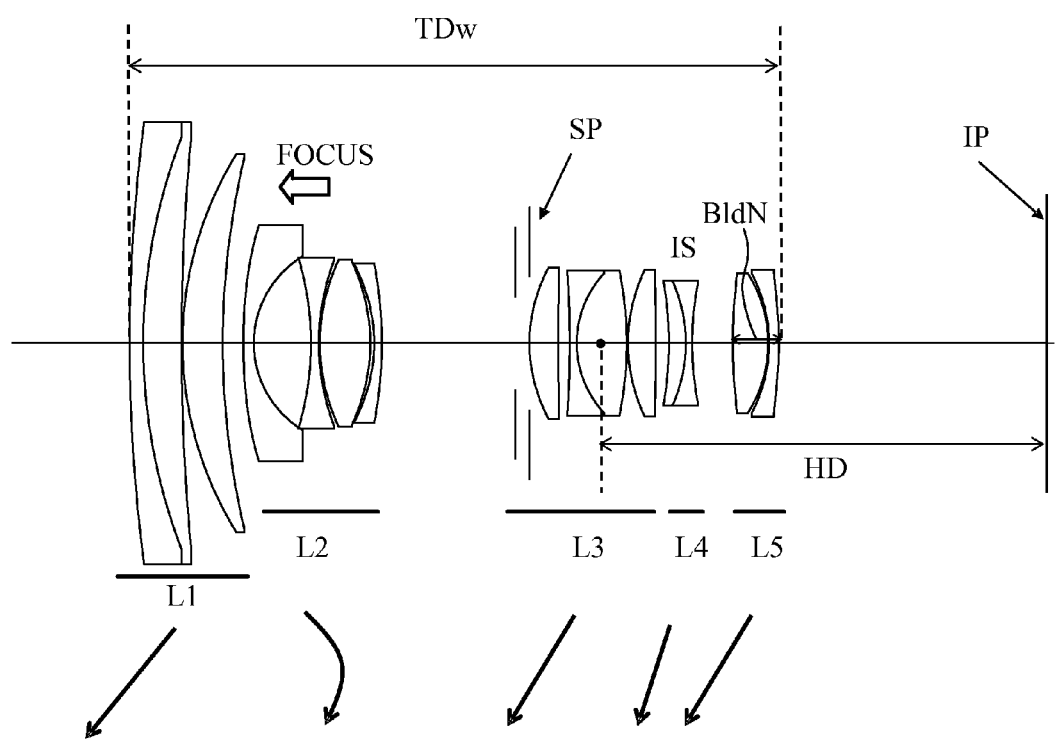
FIG. 13 is a sectional view of a zoom lens that is Embodiment 4 of the present invention at a wide angle end.
Figure 14A:
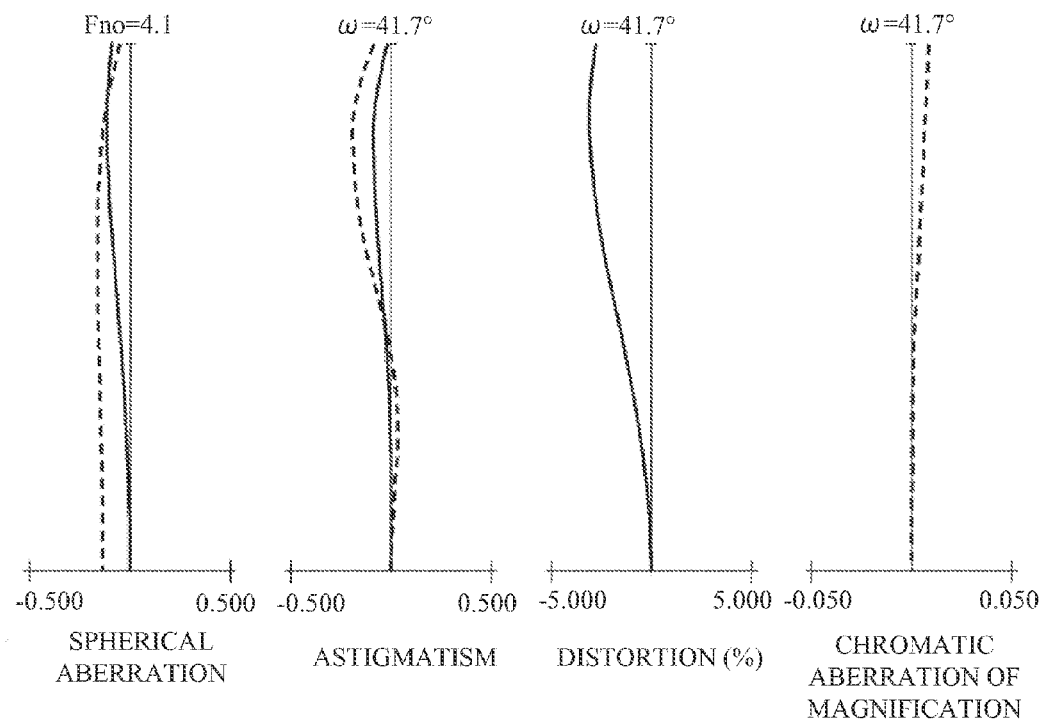
FIGS. 14A and 14B are longitudinal aberration charts of Numerical Example 4 of the present invention at a wide-angle end and a telephoto end.
Figure 14B:
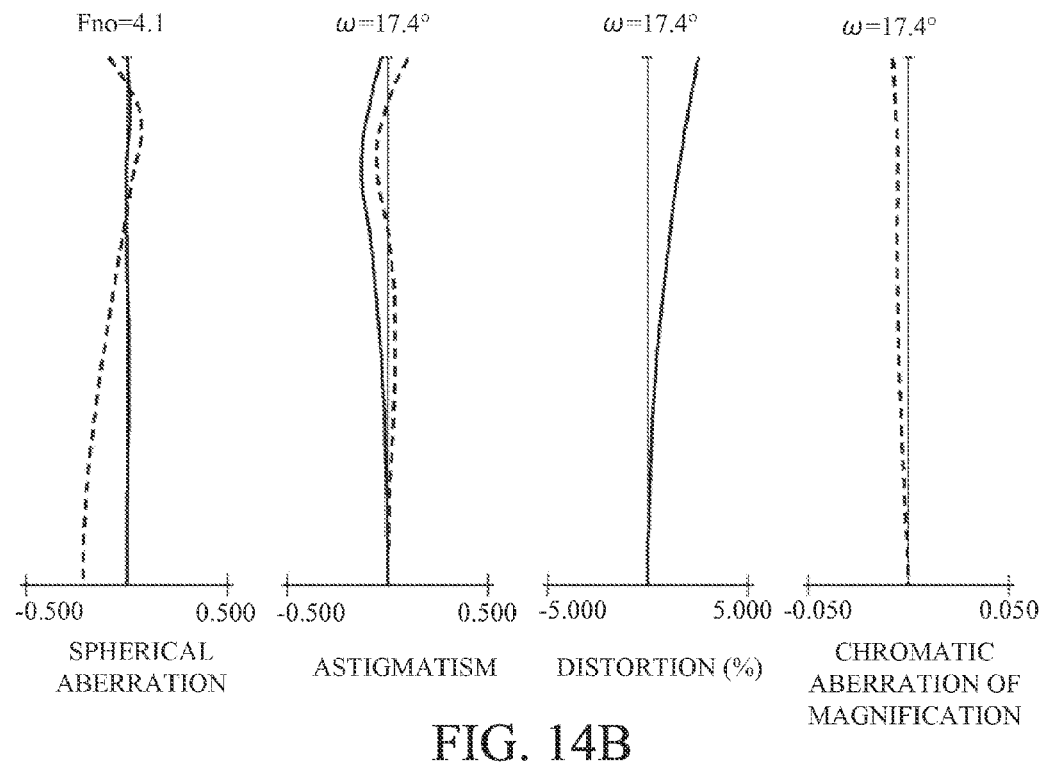
Figure 15A:
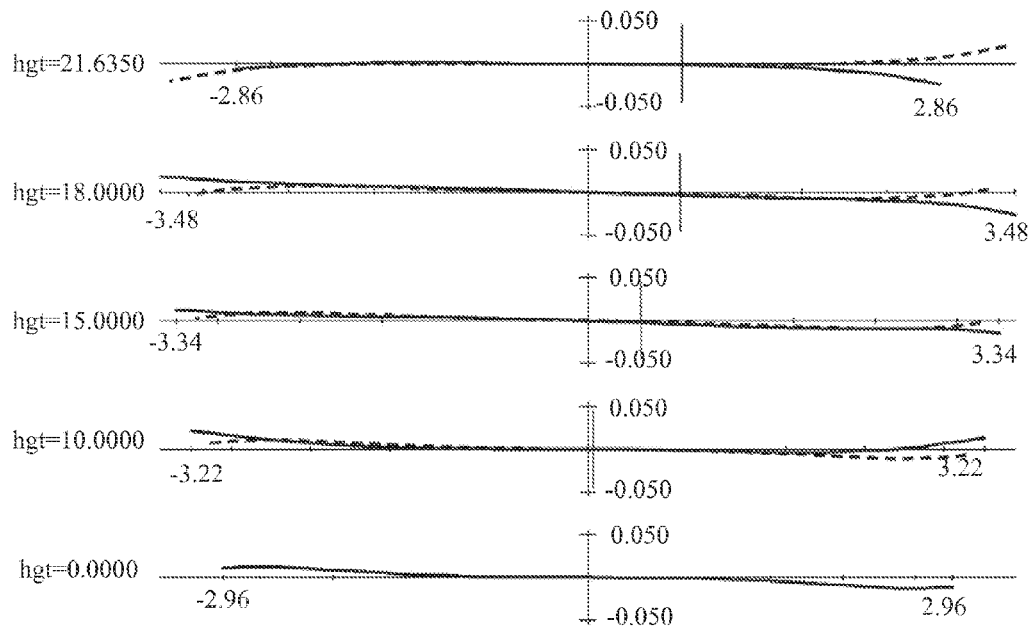
FIGS. 15A and 15B are lateral aberration charts of Numerical Example 4 of the present invention at the wide-angle end and the telephoto end.
Figure 15B:
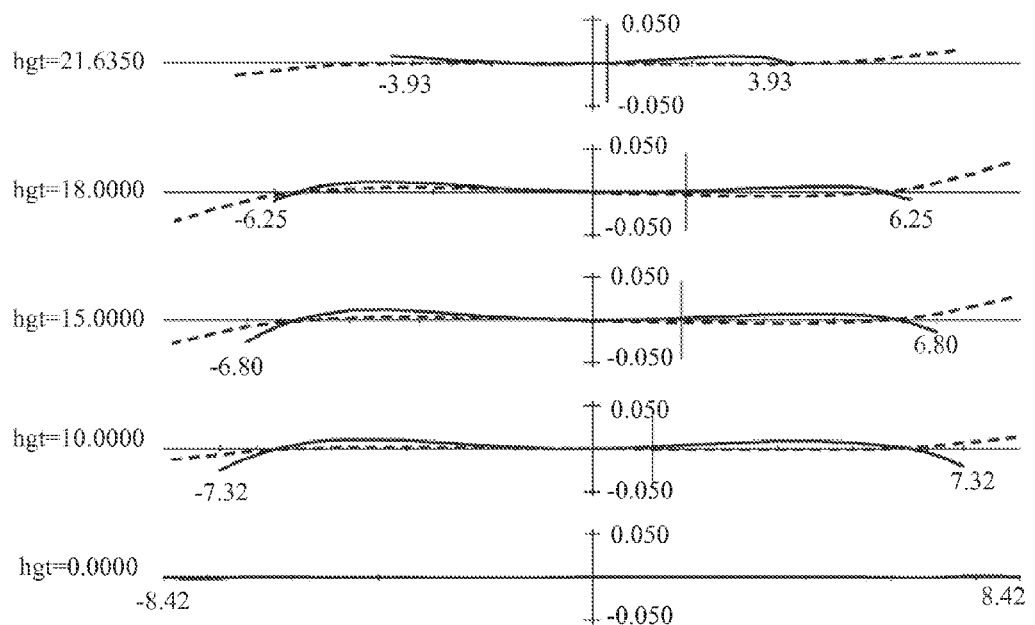
Figure 16A:
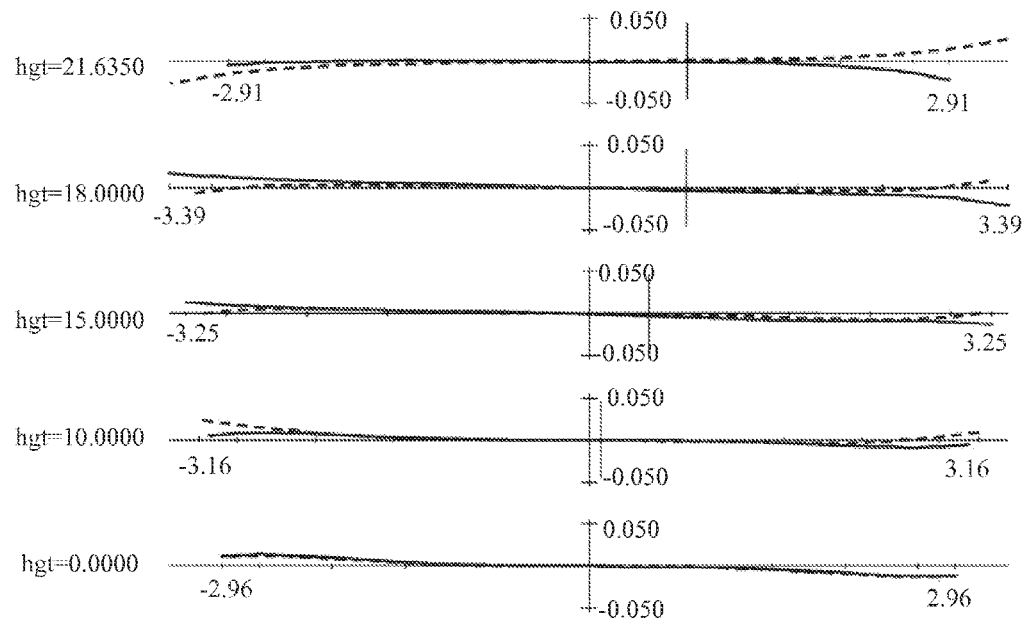
FIGS. 16A and 16B are lateral aberration charts of Numerical Example 4 at the wide-angle end and the telephoto end in a state of performing a 0.5-degree image stabilizing shift.
Figure 16B:
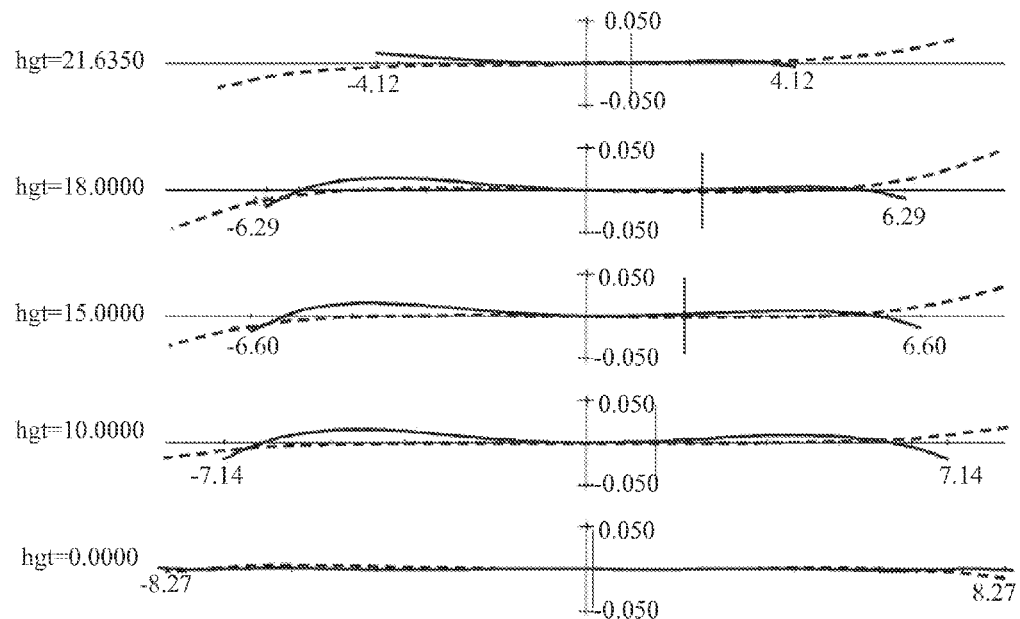
Figure 17:
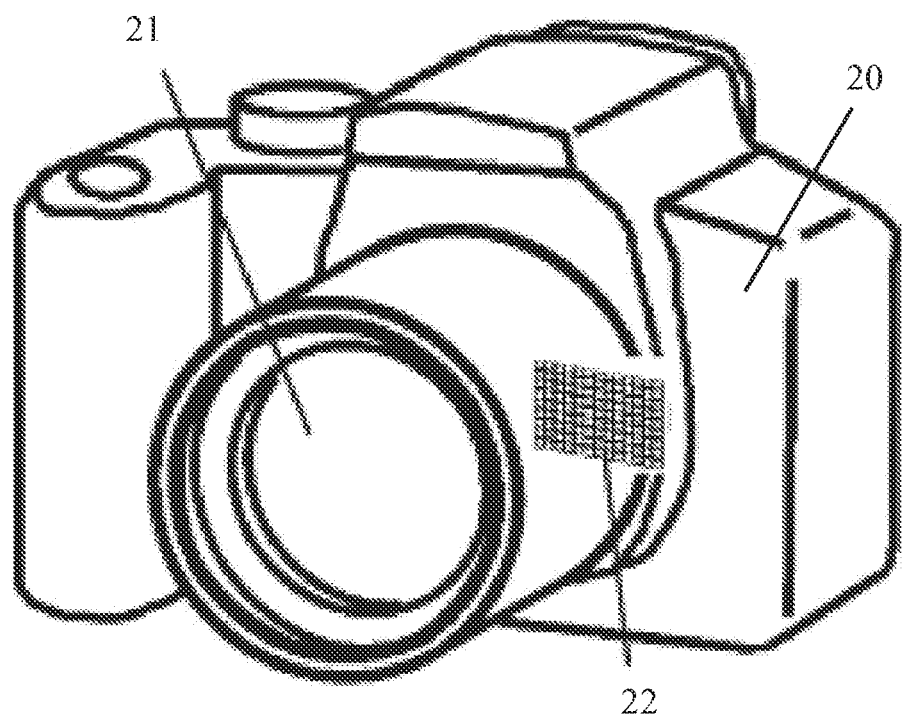
FIG. 17 a schematic view of an image pickup apparatus that is Embodiment 5 of the present invention.

FIG. 13 is a sectional view showing a configuration of the zoom lens that is a fourth embodiment (Embodiment 4) at a wide-angle end. FIGS. 14A and 14B are longitudinal aberration charts of a fourth numerical example (Numerical Example 4) corresponding to Embodiment 4 at the wide-angle end and a telephoto end. FIGS. 15A and 15B are lateral aberration charts of Numerical Example 4 at the wide-angle end and the telephoto end. FIGS. 16A and 16B are lateral aberration charts of Numerical Example 4 at the wide-angle end and the telephoto end in a state of performing a 0.5-degree image stabilizing shift. The zoom lens of Numerical Example 4 (Embodiment 4) has a zoom ratio of 2.84 and an F-number of 4.10. FIG. 17 schematically shows an image pickup apparatus provided with any one of the zoom lenses of Embodiments 1 to 4.

The zoom lens of each embodiment is used for image pickup apparatuses such as digital cameras, video cameras and silver-halide film cameras. In the sectional view of the zoom lens of each embodiment, a left side corresponds to a front side (that is, an object side or a magnifying side), and a right side corresponds to a rear side (that is, an image side or a demagnifying side). Moreover, in the sectional view of each embodiment, Li represents a lens unit number counted from the object side to the image side; a lens unit Li is referred to as "an i-th lens unit". In addition, reference character SP denotes an F-number setting member serving as an aperture stop to set (or limit) a light flux corresponding to a fully-opened F-number (Fno). The F-number setting member is hereinafter referred to as "an aperture stop".

Reference character IP denotes an image plane where an image pickup surface of an image sensor (photoelectric conversion element) such as a CCD sensor or a CMOS sensor is placed when the zoom lens is used as an image taking optical system for a video camera or a digital still camera or where a light sensitive surface (film surface) of a silver-halide film is placed when the zoom lens is used as an image taking optical system for a silver-halide film camera. In the sectional views of the zoom lens of each embodiment, arrows show movement loci of the respective lens units when zooming from the wide-angle end to the telephoto end is performed. An arrow with letters "Focus" shows a movement direction of a focus lens unit when focusing on from an infinite object to a close distance object is performed.

The longitudinal aberration charts show, in order from the left in the figure, spherical aberration (longitudinal chromatic aberration), astigmatism, distortion and chromatic aberration of magnification. In the charts showing the spherical aberration and the chromatic aberration of magnification, a solid line denotes aberration for a d-line (587.6 nm) and a dotted line denotes aberration for a g-line (435.8 nm). Moreover, in the chart showing the astigmatism, a solid line denotes astigmatism in a sagittal direction of the d-line and a dotted line denotes astigmatism in a meridional direction of the d-line. Furthermore, the chart of the distortion shows distortion for the d-line. In addition, Fno represents the F-number, and A represents a half field angle (degrees).

Longitudinal aberration charts when the image blur correction (image stabilization) is performed are omitted because the image stabilizing lens unit is decentered in a direction orthogonal to the optical axis by a minute amount and such minute decentering does not influence the longitudinal aberrations. In the lateral aberration charts, hgt represents an image height, a solid line denotes aberration in the sagittal direction of the d-line, and a dotted line denotes aberration in the meridional direction of the d-line.

Next, description is made of characteristics of general four lens unit zoom lenses such as one disclosed in Japanese Patent Laid-Open No. 2010-019945. The general four lens unit zoom lens largely moves a first lens unit, a third lens unit and a fourth lens unit to provide a magnification varying effect when zooming from a wide-angle end to a telephoto end is performed.

The following is description of optical characteristics of this four lens unit zoom lens at the wide-angle end with tracing of an axial light flux from the image side (image plane side) to the object side. At the wide-angle end, it is necessary to place a principal point of the entire zoom lens close to an image plane, so that the fourth lens unit is placed at a position closest to an image side portion of a lens main body. Thus, an incident height h of the axial light flux to the fourth lens unit is decreased, and thereby a positive refractive power does not contribute much to a divergent light flux from the image plane, which converts the axial light flux into a light flux whose divergence is somewhat reduced on the object side.

Next, the divergence of the axial light flux is increased by, of the third lens unit, an image side partial lens unit having a negative refractive power, and thereby the incident height h of the axial light flux becomes largest at, of the third lens unit, an object side partial lens unit having a positive refractive power and adjacent to the image side partial lens unit. Then, the axial light flux is converted into a convergent light flux by a strong positive refractive power of the object side partial lens unit and proceeds toward the second lens unit. Thus, of the third lens unit, the image side partial lens unit having the negative refractive power, which serves as an image stabilizing lens unit, is placed in the divergent axial light flux, and therefore the incident height h of the axial light flux to the image stabilizing lens unit is relatively small. This configuration makes it possible to relatively reduce variation of coma aberration generated when the image blur correction is performed.

Next, description is made of optical characteristics of the above four lens unit zoom lens at the telephoto end similarly with tracing of the axial light flux from the image side to the object side. At the telephoto end, in order to effectively move the principal point of the entire zoom lens to the object side, the third and fourth lens units are largely moved to the object side. Therefore, an incident height h of the axial light flux to the fourth lens unit is increased, and thereby the axial light flux is converted into a convergent light flux on the object side.

Next, the convergent light flux is converted into a near-afocal (near-collimated) light flux by, of the third lens unit in a state of being close to an object side surface of the fourth lens unit, the image side partial lens unit having the negative refractive power. The near-afocal light flux is again converted into a convergent light flux by, of the third lens unit, the object side partial lens unit having the positive refractive power and then proceeds toward the second lens unit. Thus, the incident height h of the axial light flux is always large at the fourth lens unit, the image side partial lens unit (image stabilizing lens unit) of the third lens unit and the object side partial lens unit thereof. Therefore, the variation of coma aberration generated when the image blur correction is performed is increased.

In the zoom lens disclosed in Japanese Patent Laid-Open No. 2010-019945, the variation of coma aberration generated when the image blur correction is performed is corrected by using an aspheric lens. However, variation of aberration in a sagittal image surface remains.

Next, description is made of a reason that, in general five lens unit zoom lenses such as one disclosed in Japanese Patent Laid-Open No. 2010-271362, their optical performance when the image blur correction is performed can be comparatively easily corrected compared with the above-described four lens unit zoom lenses.

In the five lens unit zoom lens at a telephoto end, the third and fifth lens units are moved to an object side in order to move a principal point of the entire zoom lens to the object side. The zoom lens is characterized in that, with the movement of the third and fifth lens units, a fourth lens unit having a negative refractive power is moved relatively thereto to an image side. Therefore, a movement amount of the fifth lens unit (rearmost lens unit) of the five lens unit zoom lens is reduced by an amount corresponding to a relative movement amount of the fourth lens unit having the negative refractive power to the image side, compared with that of the four lens unit zoom lens. The following is description of optical characteristics of this five lens unit zoom lens at the telephoto end with tracing of an axial light flux from the image side to the object side.

An incident height h of the axial light flux at the fifth lens unit becomes large, and thereby the axial light flux is converted on the object side of the fifth lens unit into a light flux whose convergence is reduced.

Next, the axial light flux is converted into a divergent light flux by the fourth lens unit having the negative refractive power in a state of being close to an object side surface of the fifth lens unit and then proceeds toward the third lens unit located away from the fourth lens unit by the relative movement amount of the fourth lens unit with respect to the third lens unit. The divergent axial light flux is converted into a convergent light flux by the third lens unit and then proceeds toward the second lens unit.

Therefore, the fourth lens unit serving as an image stabilizing lens unit is placed in the divergent axial light flux, and thereby the incident height h of the axial light flux is relatively small. Thus, in the five lens unit zoom lens, the variation of coma aberration generated when the image blur correction is performed can be sufficiently corrected without using an aspheric lens in the image stabilizing lens unit.

Each embodiment of the present invention provides a zoom lens having five or more lens units and being characterized in that its optical performance at the telephoto end when the image blur correction is performed is better than the above-described general zoom lenses.

As understood from the above description of the five lens unit zoom lens, reducing the incident height h of the axial light flux to the image stabilizing lens unit at the telephoto end enables improvement of the optical performance when the image blur correction is performed. Accordingly, each embodiment employs a configuration in which a length on the optical axis of the N-the lens unit as a most-image side lens unit (that is, a distance between a most-object side lens surface and a most-image side lens surface of the N-th lens unit) is reduced. This configuration makes a distance from the image plane to the (N−1)-th lens unit short when the (N−1)-th lens unit is moved toward the N-th lens unit for the zooming from the wide-angle end to the telephoto end, which reduces the incident height h of the axial light flux to the (N−1)-th lens unit to improve the optical performance when the image blur correction is performed.

Each embodiment achieves a compact configuration of the entire zoom lens and a wide angle of view with good balance therebetween. In general, the positive-lead type zoom lens is advantageous for providing a high zoom ratio. However, the positive-lead type zoom lens reduces an angle αa of an off-axis principal ray by the positive refractive power of the first lens unit, which makes it necessary for achieving a wide angle of view to increase the refractive power of the second lens unit and to decrease the refractive power of the first lens unit.

On the other hand, in order to correct off-axis aberrations such as distortion, chromatic aberration of magnification and field curvature generated in the second lens unit having a strong negative refractive power by the first lens unit having a weak positive refractive power, it is necessary to increase an incident height ha of the off-axis principal ray by increasing size of the first lens unit, which is likely to increase size of the entire zoom lens.

Therefore, the inventor of the present invention found that optimizing refractive power arrangement of third and subsequent lens units so as to reduce the refractive power of the second lens unit makes it possible to decrease the size of the first lens unit and thereby decrease the size of the entire zoom lens.

In conventional five lens unit zoom lenses, a distance from the image plane to an exit pupil is long, which makes a light flux in an image peripheral area telecentric. Such a configuration requires, in order to increase an object side angle of view, to increase both a positive refractive power on the image side further than an aperture stop and a negative refractive power on the object side further than the aperture stop, which results in increase in size of the first lens unit.

Therefore, each embodiment of the present invention reduces the positive refractive power of the N-th lens unit and increases the positive refractive power of the third lens unit and thereby moves an exit pupil of the entire zoom lens to the image side. In other words, each embodiment provides in advance some degree of angle to the off-axis principal ray being near telecentric on the image side. This configuration makes it possible to increase the angle αa of the off-axis principal ray to some degree by a combined lens unit constituted by the third and subsequent lens units and having a positive refractive power, so that even if the refractive power of the second lens unit is reduced, a wide angle of view can be achieved. Consequently, each embodiment enables decrease of the incident height ha of the off-axis principal ray to the first lens unit and thereby achieves the compact configuration of the entire zoom lens and the wide angle of view.

Next, description is made of specific configurations of the zoom lenses of the embodiments. The zoom lens of each embodiment has an N lens unit configuration constituted by, as described above, in order from the object side to the image side the first lens unit having a positive refractive power, the second lens unit having a negative refractive power, the (N−2)-th lens unit having a positive refractive power, the (N−1)-th lens unit having a negative refractive power, and the N-th lens unit having a positive refractive power, where N represents an integer equal to or more than 5. The entire (N−1)-th lens unit or part thereof is moved in the direction including the directional component orthogonal to the optical axis to perform the image stabilization (image blur correction).

In the following description, BldN represents a length of the N-th lens unit on the optical axis, TDw represents a distance on the optical axis between a most-object side lens surface (first lens surface) and a most-image side lens surface (rearmost lens surface) at the wide-angle end, fw represents a focal length of the entire zoom lens at the wide-angle end, and $f_N$ represents a focal length of the N-th lens unit.

In the zoom lens of each embodiment, the following conditions are satisfied:

$$0.01 < BldN/TDw < 0.09 \quad (1)$$

$$2.0 < f_N/fw < 8.0 \quad (2)$$

The zoom lens of each embodiment is a positive-lead type zoom lens with a high zoom ratio and performs the image stabilization by moving the entire (N−1)-th lens unit having the positive refractive power or part thereof to maintain good optical performance at the telephoto end during the image stabilization. Moreover, the zoom lens of each embodiment satisfying the condition (1) further improves the optical performance at the telephoto end during the image stabilization.

The condition (1) is required to be satisfied in order to facilitate correction of coma aberration generated at an image central area during the image stabilization at the telephoto end by reducing the length of the N-th lens unit on the optical axis and thereby placing the (N−1)-th lens unit (image stabilizing lens unit) at a position close to the image plane as much as possible where the incident height h of the axial light flux to the (N−1)-th lens unit is reduced. A value of BldN/TDw higher than the upper limit of the condition (1) makes the length of the N-th lens unit on the optical axis long and thereby the incident height h of the axial light flux to the image stabilizing lens unit is increased, which increases the coma aberration generated during the image stabilization.

On the other hand, a value of BldN/TDw lower than the lower limit of the condition (1) makes the length of the N-th lens unit on the optical axis too short, which makes it difficult to effectively provide a function as a lens unit having a positive refractive power to the N-th lens unit. It is desirable that the condition (1) have the following numerical range:

$$0.015 < BldN/TDw < 0.060 \quad (1a)$$

The condition (2) is required to be satisfied in order to facilitate achievement of a compact configuration of the entire zoom lens and a wide angle of view. Moreover, the condition (2) is required to be satisfied in order to effectively achieve the wide angle of view by reducing the refractive power of the N-th lens unit to a certain low level and by placing the exit pupil of the entire zoom lens closer to the image plane. A value of $f_N/fw$ higher than the upper limit of the condition (2) makes the refractive power of the N-th lens unit too weak, and thereby a magnification varying effect of the N-th lens unit is decreased, which increases, in response to the decrease, a magnification varying burden to be borne by the first lens unit L1, thereby increasing the size of the entire zoom lens.

On the other hand, a value of $f_N/fw$ lower than the lower limit of the condition (2) increases the refractive power of the N-th lens unit and increases the distance of the exit pupil of the entire zoom lens from the image plane, which makes it difficult to achieve the wide angle of view. It is desirable that the condition (2) have the following numerical range:

$$2.50 < f_N/fw < 7.50 \quad (2a)$$

As described above, each embodiment provides a zoom lens having an entirely compact configuration, a wide angle of view and a high zoom ratio and being capable of providing high optical performance even when the image blur correction is performed.

Next, description is made of conditions that are desirable to be satisfied in each embodiment. First, at the telephoto end compared with at the wide-angle end, it is desirable that the distance between the (N−2)-th lens unit and the (N−1)-th lens unit be longer and the distance between the (N−1)-th lens unit and the N-th lens unit be shorter. Satisfying this condition makes it possible to move a principal point of the combined lens unit constituted by the (N−2)-th, (N−1)-th and N-th lens units and having the positive refractive power from the image side to the object side by zooming, which can facilitate provision of the magnification varying effect.

Moreover, it is desirable to satisfy the following condition where $f_{N-2}$ represents a focal length of the (N−2)-th lens unit and $f_{N-1}$ represents a focal length of the (N−1)-th lens unit:

$$0.20 < |f_{N-2}/f_{N-1}| < 0.70 \quad (3)$$

The condition (3) is required to be satisfied in order to effectively provide a magnification varying assistance effect of the (N−2)-th, (N−1)-th and N-th lens units. Moreover, the condition (3) is required to be satisfied in order to distribute a more positive refractive power to the (N−2)-th lens unit having the positive refractive power since the positive refractive power of the N-th lens unit is reduced to a certain low level by the condition (2). Providing a certain level of strong refractive power to the (N−1)-th lens unit having the negative refractive power provides a magnification varying effect equivalent to those of normal five lens unit zoom lenses. A value of $|f_{N-2}/f_{N-1}|$ higher than the upper limit of the condition (3) decreases the refractive power of the (N−2)-th lens unit, which makes it difficult to effectively provide the magnification varying assistance effect of the (N−2)-th, (N−1)-th and N-th lens units.

On the other hand, a value of $|f_{N-2}/f_{N-1}|$ lower than the lower limit of the condition (3) increases the refractive power of the (N−2)-th lens unit, which generates large spherical aberration and thereby makes it difficult to provide high optical performance. It is more desirable that the condition (3) have the following numerical range:

$$0.30 < |f_{N-2}/f_{N-1}| < 0.50 \quad (3a)$$

Furthermore, it is desirable that the entire (N−1)-th lens unit be the image stabilizing lens unit. In each embodiment, performing the image stabilization by using the entire (N−1)-th lens unit enables simplification of the configuration of the zoom lens, which is desirable. In addition, it is desirable that the N-th lens unit be constituted by one lens having an aspheric lens surface. Constituting the N-th lens unit by one lens enables reduction of the length of the N-th lens unit on the optical axis, which desirably makes it easy to satisfy the condition (1). In order to provide a sufficient aberration correction effect to the one lens constituting the N-th lens unit, it is desirable that the one lens be an aspheric lens.

Moreover, it is more desirable to satisfy the following condition (4) where Hd represents a distance between a rear principal point of the (N−2)-th lens unit and the image plane:

$$0.30 < Hd/TDw < 0.70 \quad (4)$$

The condition (4) is required to be satisfied in order to place the rear principal point of the (N−2)-th lens unit at the wide-angle end close to the image plane.

Reducing the refractive power of the N-th lens unit so as to satisfy the condition (2) results in shift of the rear principal point of the combined lens unit constituted by the (N−2)-th, (N−1)-th and N-th lens units to the object side and thereby weakens a retro-focus refractive index arrangement, which makes it difficult to provide a wide angle of view.

Thus, in each embodiment, satisfying the condition (4) so as to place the rear principal point of the (N−2)-th lens unit close to the image plane enables placement of the rear principal point of the combined lens unit constituted by the (N−2)-th, (N−1)-th and N-th lens units at a position equivalent to those of the normal five lens unit zoom lenses.

A value of Hd/TDw higher than the upper limit of the condition (4) shifts the rear principal point of the combined lens unit constituted by the (N−2)-th, (N−1)-th and N-th lens units to the object side, which undesirably weakens the retro-focus refractive index arrangement.

On the other hand, a value of Hd/TDw lower than the lower limit of the condition (4) places the rear principal point of the (N−2)-th lens unit exceedingly to the image side and thereby decreases a space between the N-th and (N−1)-th lens units, which makes it difficult to perform a sufficient variation of magnification. It is more desirable that the condition (4) have the following numerical range:

$$0.35 < Hd/TDw < 0.60 \quad (4a)$$

In addition, it is more desirable for simplification of the zoom lens configuration of each embodiment that the (N−2)-th and N-th lens units be integrally moved (in other words, be moved along a same movement locus) during the zooming.

In each embodiment, the variation of magnification is performed by moving the (N−2)-th lens unit having the positive refractive power, the (N−1)-th lens unit having the negative refractive power and the N-th lens unit having the positive refractive power. In this configuration, it is important that, as described above, at the telephoto end compared with at the wide-angle end, the distance between the (N−2)-th and (N−1)-th lens units is longer and the distance between the (N−1)-th and N-th lens units is shorter. Even when the (N−2)-th and N-th lens units are integrally moved during the zooming, moving the (N−1)-th lens unit relatively to the (N−2)-th and N-th lens units to the image side enables satisfaction of the above relation of the two distances.

The integral movement of the (N−2)-th and N-th lens units enables elimination of one of mechanisms for moving these two lens units and thereby facilitates simplification of the configuration of, for example, the five lens unit zoom lens, to a configuration substantially equivalent to that of the four lens unit zoom lens.

Furthermore, it is desirable that the zoom lens be constituted by, in order from the object side to the image side, the first lens unit, the second lens unit, a third lens unit, a fourth lens unit, a fifth lens unit, a sixth lens unit and a seventh lens unit respectively having positive, negative, positive, negative, positive, negative and positive refractive powers. It is also desirable that the zoom lens be constituted by, in order from the object side to the image side, the first lens unit, the second lens unit, a third lens unit, a fourth lens unit and a fifth lens unit respectively having positive, negative, positive, negative and positive refractive powers.

The zoom lens of each embodiment may be a five or more lens unit zoom lens in which two or more lens units are placed between the second and third lens units.

[Embodiment 1]

Next, description is made of a detailed lens configuration of the zoom lens of each embodiment. The zoom lens of Embodiment 1 is constituted by, in order from the object side to the image side, a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power, a sixth lens unit L6 having a negative refractive power and a seventh lens unit L7 having a positive refractive power. This seven lens unit zoom lens has a zoom ratio of 2.9 times.

During zooming, the respective lens units L1 to L7 are moved in the optical axis direction such that, at the telephoto end compared with at the wide-angle end, a distance between the first lens unit L1 and the second lens unit L2 becomes longer, a distance between the second lens unit L2 and the third lens unit L3 becomes shorter, a distance between the third lens unit L3 and the fourth lens unit L4 becomes longer, a distance between the fourth lens unit L4 and the fifth lens unit L5 becomes shorter, a distance between the fifth lens unit L5 and the sixth lens unit L6 becomes longer and a distance between the sixth lens unit L6 and the seventh lens unit L7 becomes shorter. The second lens unit L2 is moved to the object side for focusing on from an infinite object to a close distance object.

During the zooming, the third, fifth and seventh lens units L3, L5 and L7 are moved along a same movement locus, which achieves a compact lens configuration. The entire sixth lens unit L6 is moved in the direction including the directional component orthogonal to the optical axis so as to shift an imaging position in the direction orthogonal to the optical axis, which performs the image stabilization. The seventh lens unit L7 is constituted by one aspheric lens and satisfies the condition (1), which can place the sixth lens unit L6 close to the image plane as much as possible when the distance between the sixth and seventh lens units L6 and L7 becomes short at the telephoto end compared with at the wide-angle end, and thereby the variation of coma aberration during the image stabilization is reduced.

Furthermore, the seventh lens unit L7 satisfies the condition (2), which moves an exit pupil of the entire zoom lens to the image side and thereby facilitates achievement of an entirely compact configuration and a wide angle of view. In addition, the fifth lens unit L5 satisfies the conditions (3) and (4), which increases the refractive power of the fifth lens unit L5 to compensate for the reduced refractive power of the seventh lens unit L7 and places a rear principal point of the fifth lens unit L5 on the image side. Thereby, refractive power arrangement of the fifth to seventh lens units L5 to L7 is appropriately set, and variation of magnification thereby is effectively performed.

[Embodiment 2]

The zoom lens of Embodiment 2 is constituted by, in order from the object side to the image side, a first lens unit L1 having a positive refractive power, a second lens unit L2 having a negative refractive power, a third lens unit L3 having a positive refractive power, a fourth lens unit L4 having a negative refractive power and a fifth lens unit L5 having a positive refractive power. This five lens unit zoom lens has a zoom ratio of 2.9 times.

During zooming, the respective lens units L1 to L5 are moved in the optical axis direction such that, at the telephoto end compared with at the wide-angle end, a distance between the first lens unit L1 and the second lens unit L2 becomes longer, a distance between the second lens unit L2 and the third lens unit L3 becomes shorter, a distance between the third lens unit L3 and the fourth lens unit L4 becomes longer and a distance between the fourth lens unit L4 and the fifth lens unit L5 becomes shorter. The second lens unit L2 is moved to the object side for focusing on from an infinite object to a close distance object.

During the zooming, the third and fifth lens units L3 and L5 are moved along a same movement locus, which achieves a compact lens configuration. The entire fourth lens unit L4 is moved in the direction including the directional component orthogonal to the optical axis to perform the image stabilization. The fifth lens unit L5 is constituted by one aspheric lens and satisfies the condition (1), which can place the fourth lens unit L4 close to the image plane as much as possible when the distance between the fourth and fifth lens units L4 and L5 becomes short at the telephoto end compared with at the wide-angle end, and thereby the variation of coma aberration during the image stabilization is reduced.

Furthermore, the fifth lens unit L5 satisfies the condition (2), which moves an exit pupil of the entire zoom lens to the image side and thereby facilitates achievement of an entirely compact configuration and a wide angle of view. In addition, the third lens unit L3 satisfies the conditions (3) and (4), which increases the refractive power of the third lens unit L3 to compensate for the reduced refractive power of the fifth lens unit L5 and places a rear principal point of the third lens unit L3 on the image side. Thereby, refractive power arrangement of the third to fifth lens units L3 to L5 is appropriately set, and variation of magnification thereby is effectively performed.

[Embodiment 3]

The zoom lens of Embodiment 3 is constituted by, in order from the object side to the image side, a first lens unit L1 having a positive refractive power, a second lens unit L2 having a negative refractive power, a third lens unit L3 having a positive refractive power, a fourth lens unit L4 having a negative refractive power, a fifth lens unit L5 having a positive refractive power, a sixth lens unit L6 having a negative refractive power and a seventh lens unit L7 having a positive refractive power. This seven lens unit zoom lens has a zoom ratio of 2.9 times.

Distances between the lens units during zooming are changed in a same manner as in Embodiment 1. The description relating to the focusing, the image stabilization and the conditions (1) to (4) in Embodiment 1 also applies to this embodiment.

[Embodiment 4]

The zoom lens of Embodiment 4 is constituted by, in order from the object side to the image side, a first lens unit L1 having a positive refractive power, a second lens unit L2 having a negative refractive power, a third lens unit L3 having a positive refractive power, a fourth lens unit L4 having a negative refractive power and a fifth lens unit L5 having a positive refractive power. This five lens unit zoom lens has a zoom ratio of 2.9 times.

Distances between the lens units during zooming are changed in a same manner as in Embodiment 1. The description relating to the focusing and the image stabilization in Embodiment 2 also applies to this embodiment.

In this embodiment, the fifth lens unit L5 is constituted by two lenses, and thereby a length of the fifth lens unit L5 is longer compared with the case where the fifth lens unit L5 is constituted by one aspheric lens. However, the length of the fifth lens unit L5 on the optical axis in this embodiment is within a range satisfying the condition (1), and therefore the zoom lens of this embodiment can provide a sufficient effect similar to that of Embodiments 2. The description relating to the conditions (2) to (4) in Embodiment 2 also applies to this embodiment.

[Embodiment 5]

Next, description is made of a digital still camera as an image pickup apparatus that is a fifth embodiment (Embodiment 5) of the present invention with reference to FIG. 17. In FIG. 17, reference numeral 20 denotes a camera body, and reference numeral 21 denotes an image taking optical system constituted by the zoom lens described in any one of Embodiments 1 to 4. Reference numeral 22 denotes a solid image sensor (photoelectric conversion element) such as a CCD sensor or a CMOS sensor. The image sensor 22 receives an object image formed by the image taking optical system 21.

The effects described in Embodiments 1 to 4 are effectively provided in image pickup apparatuses such as one described in this embodiment. The zoom lenses described in Embodiments 1 to 4 and alternative embodiments of the present invention can be used in various optical apparatuses (such as image pickup apparatuses, image projection apparatuses and others) provided with a zoom lens.

Next, Numerical Examples 1 to 4 respectively corresponding to Embodiments 1 to 4 are shown. In each numerical example, i (=1, 2, 3, . . . ) represents a surface number counted from the object side, ri represents a curvature radius of an i-th lens surface, and di represents a thickness or an aerial distance between the i-th lens surface and an (i+1)-th lens surface. Moreover, ndi and vdi respectively represent a refractive index and an Abbe number of a material of an i-th lens. BF represents a back focus. When the lens surface has an aspheric shape, which is shown by "*", the aspheric shape is expressed by the following expression where X represents a position (coordinate) in the optical axis direction, H represents a position (coordinate) in the direction orthogonal to the optical axis, a light proceeding direction is denoted as a positive direction, r represents a paraxial curvature radius of the lens surface, and K, A4, A6, A8 A10 and A12 represent aspheric coefficients:

$$X = \frac{(1/r) \times H^2}{1 + \sqrt{1 - (1+k) \times (H/r)^2}} + A4 \times H^4 +$$

$$A6 \times H^6 + A8 \times H^8 + A10 \times H^{10} + A12 \times H^{12}$$

In each aspheric coefficient, "e-x" means "×10⁻ˣ". Moreover, each numerical example shows various specs such as a focal length of the entire zoom lens, an F-number, a half field angle, an image height as a maximum image height deciding the half field angle, and a total lens length as a distance from the first lens surface to the image plane on the optical axis. The back focus BF is a distance from the rearmost lens surface to the image plane on the optical axis.

Moreover, lens unit data shows a focal length of each lens unit, a length thereof on the optical axis, and positions of a front principal point and a rear principal point thereof. Furthermore, an optical surface distance d shown by "variable" is varied during zooming, and specific optical surface distances corresponding to focal lengths (at the wide-angle end, the telephoto end and a middle zoom position) are shown in an appendix. An effective diameter shown by "variable" denotes a variable aperture of an aperture stop (denoted by AS) whose aperture diameter is varied with the zooming, and specific effective diameters corresponding to the focal lengths are shown as ea in another appendix.

Moreover, optical performance when the image stabilization is performed shown in each numerical example is one at an image stabilizing shift of 0.5 degrees, that is, in a state where the image stabilizing lens unit is shifted to a position at which a light ray reversely traced from an infinite object point on the optical axis is shifted on the image plane by $\Delta Y = f \cdot \tan 0.5°$ from the optical axis. Values of the respective conditions (1) to (4) in each of Numerical Examples 1 to 4 are shown in Table 1.

NUMERICAL EXAMPLE 1

Unit mm
Surface data

| Surface number | r | d | nd | vd | Effective diameter |
|---|---|---|---|---|---|
| 1 | 244.112 | 2.00 | 1.84666 | 23.8 | 62.18 |
| 2 | 70.196 | 6.23 | 1.77250 | 49.6 | 56.48 |
| 3 | 335.290 | 0.15 | | | 55.34 |
| 4 | 54.589 | 5.57 | 1.77250 | 49.6 | 51.93 |
| 5 | 129.741 | (variable) | | | 50.79 |
| 6* | 88.687 | 1.80 | 1.77250 | 49.6 | 33.01 |
| 7 | 14.403 | 8.45 | | | 23.35 |
| 8 | −33.568 | 1.30 | 1.77250 | 49.6 | 22.82 |
| 9 | 37.697 | 0.62 | | | 22.06 |
| 10 | 35.988 | 5.57 | 1.80518 | 25.4 | 22.21 |
| 11 | −71.710 | (variable) | | | 21.68 |
| 12 | 32.225 | 3.78 | 1.71736 | 29.5 | 19.17 |
| 13 | −82.351 | (variable) | | | 19.17 |
| 14 | −37.863 | 1.00 | 1.90366 | 31.3 | 18.75 |
| 15 | 97.924 | (variable) | | | 19.16 |
| 16 | ∞ | 2.00 | | | (variable) |
| 17(AS) | ∞ | 0.00 | | | 20.87 |
| 18 | 34.648 | 6.25 | 1.59282 | 68.6 | 21.73 |
| 19 | −31.951 | 0.15 | | | 21.84 |
| 20 | 36.323 | 6.48 | 1.49700 | 81.5 | 20.48 |
| 21 | −20.515 | 1.00 | 1.90366 | 31.3 | 19.31 |
| 22 | −264.091 | (variable) | | | 18.99 |
| 23 | 187.038 | 0.90 | 1.80000 | 29.8 | 17.36 |
| 24 | 16.784 | 2.98 | 1.84666 | 23.8 | 16.82 |
| 25 | 44.446 | (variable) | | | 16.51 |
| 26 | 80.344 | 3.33 | 1.58313 | 59.4 | 21.88 |
| 27* | −89.432 | | | | 22.60 |

Aspheric surface data

6th surface

K = 0.00000e+000 A 4 = 8.98821e−006 A 6 = −1.42285e−008
A 8 = 3.04974e−011 A10 = −6.43979e−014 A12 = 7.13375e−017

27th surface

K = 0.00000e+000 A 4 = 1.79006e−005 A 6 = 3.09106e−009
A 8 = 2.10449e−010 A10 = −6.98537e−013

Various data
Zoom ratio 2.84

| | Wide | Middle | Tele |
|---|---|---|---|
| Focal length | 24.30 | 35.10 | 68.99 |
| F-number | 4.10 | 4.10 | 4.10 |
| Half field angle | 41.68 | 31.65 | 17.41 |
| Image height | 21.64 | 21.64 | 21.64 |
| Total Lens Length | 134.63 | 141.64 | 168.69 |
| BF | 39.12 | 46.74 | 62.83 |
| d 5 | 2.98 | 10.63 | 30.15 |
| d11 | 17.91 | 9.66 | 1.10 |
| d13 | 1.52 | 2.06 | 3.12 |
| d15 | 3.56 | 3.03 | 1.97 |
| d22 | 1.21 | 4.37 | 8.47 |
| d25 | 8.76 | 5.60 | 1.50 |
| ea16 | 13.57 | 15.52 | 19.89 |

NUMERICAL EXAMPLE 2

Unit mm
Surface data

| Surface number | r | d | nd | vd | Effective diameter |
|---|---|---|---|---|---|
| 1 | 244.062 | 2.00 | 1.84666 | 23.8 | 64.64 |
| 2 | 83.927 | 6.00 | 1.77250 | 49.6 | 62.03 |
| 3 | 350.238 | 0.15 | | | 61.42 |
| 4 | 55.880 | 6.03 | 1.77250 | 49.6 | 57.19 |
| 5 | 122.534 | (variable) | | | 55.99 |
| 6* | 98.398 | 1.80 | 1.77250 | 49.6 | 34.14 |
| 7 | 14.795 | 8.25 | | | 24.22 |
| 8 | −46.504 | 1.30 | 1.77250 | 49.6 | 23.85 |
| 9 | 24.603 | 0.24 | | | 22.69 |
| 10 | 24.192 | 5.19 | 1.80518 | 25.4 | 22.85 |
| 11 | −159.562 | (variable) | | | 22.41 |
| 12 | 40.237 | 8.90 | 1.69895 | 30.1 | 17.28 |
| 13 | −49.463 | 0.83 | | | 17.86 |
| 14 | −35.012 | 1.00 | 1.80518 | 25.4 | 17.81 |
| 15 | 92.952 | 1.95 | | | 18.27 |
| 16(AS) | ∞ | 2.00 | | | 19.01 |
| 17 | ∞ | 0.00 | | | (variable) |
| 18 | 29.397 | 6.29 | 1.59282 | 68.6 | 20.95 |
| 19 | −44.553 | 0.15 | | | 20.96 |
| 20 | 42.750 | 6.14 | 1.49700 | 81.5 | 20.20 |
| 21 | −21.086 | 1.00 | 1.90366 | 31.3 | 19.28 |
| 22 | −61.117 | (variable) | | | 19.17 |
| 23 | 444.046 | 0.90 | 1.80100 | 35.0 | 16.43 |
| 24 | 20.297 | 2.48 | 1.84666 | 23.8 | 15.89 |
| 25 | 44.951 | (variable) | | | 15.53 |
| 26 | −940.184 | 2.57 | 1.85400 | 40.4 | 19.64 |
| 27* | −82.910 | | | | 20.38 |

Aspheric surface data

6th surface

K = 0.00000e+000 A 4 = 6.96342e−006 A 6 = −1.16139e−008
A 8 = 1.81152e−011 A10 = −2.30739e−014 A12 = 1.21944e−017

27th surface

K = 0.00000e+000 A 4 = 1.58011e−005 A 6 = 1.25331e−008
A 8 = 2.62340e−010 A10 = −7.51678e−013

Various data
Zoom ratio 2.84

| | Wide | Middle | Tele |
|---|---|---|---|
| Focal length | 24.30 | 35.10 | 68.97 |
| F-number | 4.12 | 4.24 | 4.10 |
| Half field angle | 41.68 | 31.65 | 17.42 |
| Image height | 21.64 | 21.64 | 21.64 |
| Total Lens Length | 134.70 | 138.57 | 169.18 |
| BF | 39.08 | 48.50 | 60.06 |
| d 5 | 2.77 | 6.78 | 33.95 |
| d11 | 18.78 | 9.21 | 1.10 |
| d22 | 1.20 | 3.92 | 7.41 |
| d25 | 7.71 | 4.99 | 1.50 |
| ea17 | 13.84 | 15.95 | 21.17 |

NUMERICAL EXAMPLE 3

Unit mm
Surface data

| Surface number | r | d | nd | vd | Effective diameter |
|---|---|---|---|---|---|
| 1 | 231.709 | 2.10 | 1.84666 | 23.8 | 61.88 |
| 2 | 74.605 | 5.52 | 1.77250 | 49.6 | 56.41 |
| 3 | 265.186 | 0.15 | | | 55.01 |
| 4 | 52.560 | 5.34 | 1.77250 | 49.6 | 49.66 |
| 5 | 134.582 | (variable) | | | 48.61 |
| 6* | 88.149 | 1.90 | 1.77250 | 49.6 | 38.10 |
| 7 | 15.331 | 9.99 | | | 26.39 |
| 8 | −42.994 | 1.30 | 1.72000 | 50.2 | 25.98 |
| 9 | 30.100 | 0.15 | | | 24.92 |
| 10 | 28.459 | 5.48 | 1.80518 | 25.4 | 25.05 |
| 11 | −128.056 | (variable) | | | 24.58 |
| 12 | 45.165 | 2.38 | 1.69895 | 30.1 | 18.55 |
| 13 | 812.728 | (variable) | | | 18.62 |
| 14 | −38.378 | 1.00 | 1.84666 | 23.8 | 19.30 |
| 15 | −129.346 | (variable) | | | 19.87 |
| 16 | ∞ | 2.00 | | | (variable) |
| 17(AS) | ∞ | 0.00 | | | 21.60 |
| 18 | 29.842 | 5.64 | 1.59282 | 68.6 | 22.59 |
| 19 | −45.232 | 0.15 | | | 22.50 |
| 20 | 36.171 | 6.22 | 1.49700 | 81.5 | 21.27 |
| 21 | −24.891 | 1.00 | 1.90366 | 31.3 | 20.11 |
| 22 | −126.271 | (variable) | | | 19.69 |
| 23 | 275.852 | 0.90 | 1.80100 | 35.0 | 17.34 |
| 24 | 20.702 | 2.26 | 1.84666 | 23.8 | 16.69 |
| 25 | 44.008 | (variable) | | | 16.34 |
| 26 | 122.598 | 2.35 | 1.85400 | 40.4 | 18.77 |
| 27* | 4930.262 | | | | 19.27 |

Aspheric surface data

6th surface

K = 0.00000e+000 A 4 = 5.43827e−006 A 6 = −7.32059e−009
A 8 = 1.15564e−011 A10 = −1.09310e−014

27th surface

K = 0.00000e+000 A 4 = 2.07361e−005 A 6 = −3.08819e−009
A 8 = 4.68412e−010 A10 = −1.71513e−012

Various data
Zoom ratio 2.84

| | Wide | Middle | Tele |
|---|---|---|---|
| Focal length | 24.30 | 35.10 | 69.00 |
| F-number | 4.10 | 4.10 | 4.10 |
| Half field angle | 41.68 | 31.65 | 17.41 |
| Image height | 21.64 | 21.64 | 21.64 |
| Total Lens Length | 133.57 | 135.98 | 161.10 |
| BF | 39.71 | 48.99 | 63.18 |
| d 5 | 0.90 | 4.51 | 25.87 |
| d11 | 22.01 | 11.53 | 1.10 |
| d13 | 4.76 | 5.93 | 6.74 |
| d15 | 3.48 | 2.31 | 1.50 |
| d22 | 1.20 | 2.75 | 5.10 |
| d25 | 5.68 | 4.12 | 1.77 |
| ea16 | 14.08 | 16.60 | 20.71 |

NUMERICAL EXAMPLE 4

Unit mm
Surface data

| Surface number | r | d | nd | vd | Effective diameter |
|---|---|---|---|---|---|
| 1 | 244.225 | 2.00 | 1.84666 | 23.8 | 63.07 |
| 2 | 83.751 | 5.56 | 1.77250 | 49.60 | 58.74 |
| 3 | 320.295 | 0.15 | | | 58.01 |
| 4 | 52.387 | 5.85 | 1.77250 | 49.6 | 53.82 |
| 5 | 117.578 | (variable) | | | 52.66 |
| 6* | 84.539 | 1.50 | 1.88300 | 40.8 | 33.21 |
| 7 | 14.835 | 8.37 | | | 24.18 |
| 8 | −42.802 | 1.10 | 1.77250 | 49.6 | 23.79 |
| 9 | 33.406 | 0.15 | | | 22.97 |
| 10 | 28.090 | 7.38 | 1.74000 | 28.3 | 23.14 |
| 11 | −27.688 | 0.57 | | | 22.56 |

-continued

| | | | | | |
|---|---|---|---|---|---|
| 12 | −23.904 | 1.10 | 1.72000 | 43.7 | 22.16 |
| 13 | −61.111 | (variable) | | | 21.74 |
| 14 | ∞ | 2.00 | | | (variable) |
| 15(AS) | ∞ | 0.00 | | | 19.60 |
| 16 | 23.085 | 4.27 | 1.84666 | 23.8 | 20.79 |
| 17 | 1337.697 | 1.63 | | | 20.39 |
| 18 | −150.192 | 1.00 | 1.84666 | 23.8 | 19.89 |
| 19 | 15.019 | 7.31 | 1.49700 | 81.5 | 19.18 |
| 20 | −52.397 | 0.15 | | | 19.78 |
| 21 | 24.566 | 4.10 | 1.59282 | 68.6 | 20.18 |
| 22 | −253.590 | (variable) | | | 19.73 |
| 23 | −52.684 | 2.48 | 1.84666 | 23.8 | 17.08 |
| 24 | −22.073 | 0.90 | 1.61340 | 44.3 | 16.95 |
| 25 | 45.671 | (variable) | | | 16.20 |
| 26 | 76.888 | 5.18 | 1.49700 | 81.5 | 18.60 |
| 27 | −18.918 | 0.15 | | | 19.21 |
| 28 | −21.455 | 1.40 | 1.85400 | 40.4 | 19.14 |
| 29* | −54.615 | | | | 20.27 |

Aspheric surface data

6th surface

K = 0.00000e+000 A 4 = 7.12321e−006 A 6 = −7.50723e−009
A 8 = 5.47249e−012 A10 = 1.03630e−014

29th surface

K = 0.00000e+000 A 4 = 1.88052e−005 A 6 = 1.51555e−008
A 8 = 2.92228e−010 A10 = −6.98610e−013

Various data
Zoom ratio 2.84

| | Wide | Middle | Tele |
|---|---|---|---|
| Focal length | 24.30 | 35.00 | 69.01 |
| F-number | 4.10 | 4.10 | 4.10 |
| Half field angle | 41.68 | 31.72 | 17.41 |
| Image height | 21.64 | 21.64 | 21.64 |
| Total Lens Length | 133.59 | 138.76 | 164.80 |
| BF | 39.00 | 46.89 | 60.00 |
| d 5 | 3.02 | 9.58 | 32.00 |
| d13 | 19.47 | 10.20 | 0.71 |
| d22 | 1.88 | 3.50 | 5.76 |
| d25 | 5.90 | 4.28 | 2.02 |
| ea14 | 13.70 | 15.46 | 18.60 |

TABLE 1

| | | Numerical Example 1 | Numerical Example 2 | Numerical Example 3 | Numerical Example 4 |
|---|---|---|---|---|---|
| | * Lens Unit | PNPNPNP | PNPNP | PNPNPNP | PNPNP |
| | fw | 24.303 | 24.300 | 24.3 | 24.2992 |
| | ft | 68.991 | 68.968 | 28.999 | 69.007 |
| | $f_N$ | 73.107 | 106.326 | 147.185 | 114.754 |
| | $f_{N-1}$ | −85.177 | −68.194 | 71.508 | −52.535 |
| | $f_{N-2}$ | 28.421 | 27.427 | 26.420 | 25.289 |
| | BldN | 3.330 | 2.572 | 2.351 | 6.731 |
| | TDw | 134.630 | 134.700 | 133.570 | 133.590 |
| | Hd | 64.521 | 64.423 | 59.382 | 64.851 |
| (1) | BldN/TDw | 0.025 | 0.019 | 0.018 | 0.050 |
| (2) | $f_N$/fW | 3.008 | 4.376 | 6.057 | 4.723 |
| (3) | $|f_{N-2}/f_{N-1}|$ | 0.334 | 0.402 | 0.369 | 0.481 |
| (4) | Hd/TDw | 0.479 | 0.478 | 0.445 | 0.485 |

* Lens Unit: P—Positive N—Negative

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-149260, filed Jul. 3, 2012, which is hereby incorporated by reference herein in its entirety.

What is claimed is:

1. A zoom lens comprising in order from an object side to an image side where N represents an integer equal to 5 or 7:
a first lens unit having a positive refractive power;
a second lens unit having a negative refractive power;
an (N−2)-th lens unit having a positive refractive power;
an (N−1)-th lens unit having a negative refractive power; and
an N-th lens unit having a positive refractive power,
wherein distances between adjacent ones of the first, second, (N−2)-th, (N−1)-th and N-th lens units in a direction of an optical axis are changed during zooming,
wherein the (N−1)-th lens unit includes an image stabilizing unit movable for image blur correction in a direction including a directional component orthogonal to the optical axis, and
wherein the following conditions are satisfied:

$$0.01 < BldN/TDw < 0.09$$

$$2.0 < f_N/fw < 8.0$$

where BldN represents a thickness of the N-th lens unit on the optical axis, TDw represents a distance on the optical axis between a most object side lens surface and a most-image side lens surface at a wide-angle end, fw represents a focal length of the entire zoom lens at the wide-angle end, and $f_N$ represents a focal length of the N-th lens unit.

2. A zoom lens according to claim 1, wherein, at a telephoto end compared with at the wide-angle end, the distance between the (N−2)-th lens unit and the (N−1)-th lens unit is longer, and the distance between the (N−1)-th lens unit and the N-th lens unit is shorter.

3. A zoom lens according to claim 1, wherein the following condition is satisfied:

$$0.20 < |f_{N-2}/f_{N-1}| < 0.70$$

where $f_{N-2}$ represents a focal length of the (N−2)-th lens unit, and $f_{N-1}$ represents a focal length of the (N−1)-th lens unit.

4. A zoom lens according to claim 1, wherein the entire (N−1)-th lens unit constitutes the image stabilizing unit.

5. A zoom lens according to claim 1, wherein the N-th lens unit is constituted by one lens having an aspheric lens surface.

6. A zoom lens according to claim 1, wherein the following condition is satisfied:

$$0.30 < Hd/TDw < 0.70$$

where Hd represents a distance between a rear principal point of the (N−2)-th lens unit and an image plane at the wide-angle end.

7. A zoom lens according to claim 1, wherein the (N−2)-th lens unit and the N-th lens unit are moved along a same movement locus during the zooming.

8. A zoom lens according to claim 1, wherein the zoom lens comprises in order from the object side to the image side:
the first lens unit;
the second lens unit;
a third lens unit having a positive refractive power;
a fourth lens unit having a negative refractive power;
a fifth lens unit having a positive refractive power;
a sixth lens unit having a negative refractive power; and
a seventh lens unit having a positive refractive power,
wherein the first to seventh lens units are each moved in the direction of the optical axis during the zooming.

9. A zoom lens according to claim 1, wherein the zoom lens comprises in order from the object side to the image side:
the first lens unit;
the second lens unit;
a third lens unit having a positive refractive power;
a fourth lens unit having a negative refractive power; and
a fifth lens unit having a positive refractive power,
wherein the first to fifth lens units are each moved in the direction of the optical axis during the zooming.

10. An image pickup apparatus comprising:
a zoom lens; and
an image sensor to receive an optical image formed by the zoom lens,
wherein the zoom lens comprises in order from an object side to an image side where N represents an integer equal to 5 or 7:
a first lens unit having a positive refractive power;
a second lens unit having a negative refractive power;
an (N−2)-th lens unit having a positive refractive power;
an (N−1)-th lens unit having a negative refractive power; and
an N-th lens unit having a positive refractive power,
wherein distances between adjacent ones of the first, second, (N−2)-th, (N−1)-th and N-th lens units in a direction of an optical axis are changed during zooming,
wherein the (N−1)-th lens unit includes an image stabilizing unit movable for image blur correction in a direction including a directional component orthogonal to the optical axis, and
wherein the following conditions are satisfied:

$0.01 < BldN/TDw < 0.09$ $2.0 < f_N/fw < 8.0$ where BldN represents a thickness of the N-th lens unit on the optical axis, TDw represents a distance on the optical axis between a most object side lens surface and a most-image side lens surface at a wide-angle end, fw represents a focal length of the entire zoom lens at the wide-angle end, and $f_N$ represents a focal length of the N-th lens unit.

* * * * *